United States Patent
Wentzloff et al.

(10) Patent No.: US 11,044,009 B2
(45) Date of Patent: *Jun. 22, 2021

(54) METHODS AND APPARATUS FOR NETWORKING USING A PROXY DEVICE AND BACKCHANNEL COMMUNICATION

(71) Applicant: PsiKick Inc., Charlottesville, VA (US)

(72) Inventors: David D. Wentzloff, Ann Arbor, MI (US); Benton H. Calhoun, Charlottesville, VA (US); Nathan E. Roberts, Charlottesville, VA (US); Nirmalendu Patra, Charlottesville, VA (US)

(73) Assignee: EVERACTIVE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,728

(22) Filed: Apr. 13, 2016

(65) Prior Publication Data
US 2016/0373185 A1 Dec. 22, 2016

Related U.S. Application Data

(63) Continuation-in-part of application No. 14/213,771, filed on Mar. 14, 2014, now Pat. No. 10,667,214, and
(Continued)

(51) Int. Cl.
*H04W 4/00* (2018.01)
*H04B 7/26* (2006.01)
(Continued)

(52) U.S. Cl.
CPC .............. *H04B 7/26* (2013.01); *H04L 67/10* (2013.01); *H04W 52/0212* (2013.01);
(Continued)

(58) Field of Classification Search
CPC ............... H04B 7/26; H04W 52/0229; H04W 52/0216; H04W 52/0212; H04W 52/262; H04L 67/10; Y02B 60/50; Y02D 30/70
(Continued)

(56) References Cited

U.S. PATENT DOCUMENTS 6,343,185 B1  1/2002  Aoshima et al.
6,535,724 B1  3/2003  Pernici et al.
(Continued)

OTHER PUBLICATIONS

Selected USPTO Documents from 2003/0091064.
(Continued)

*Primary Examiner* — Mang Hang Yeung
(74) *Attorney, Agent, or Firm* — Martensen IP; Barbara B. Courtney

(57) ABSTRACT

Embodiments include methods and apparatus for wireless network communication between a device that operates a radio in compliance with a wireless communication standard and another device that may not be capable of complying with the wireless communication standard. In an embodiment a sender of a wireless standard compliant message modulates backchannel data on a wireless standard compliant message. The wireless standard compliant message may be addressed to an IP address of a compliant device. However the compliant message may have no meaning for the addressee. A noncompliant device within wireless range of the compliant message receives the message and demodulates the backchannel information. The noncompliant device this does not require a wireless standard radio to be on in order to receive messages and can operate at very low power.

18 Claims, 27 Drawing Sheets

Related U.S. Application Data a continuation-in-part of application No. 14/880,951, filed on Oct. 12, 2015, now Pat. No. 10,420,072.

(51) Int. Cl.
*H04W 52/02* (2009.01)
*H04L 29/08* (2006.01)
*H04W 52/26* (2009.01)

(52) U.S. Cl.
CPC ... *H04W 52/0216* (2013.01); *H04W 52/0229* (2013.01); *H04W 52/262* (2013.01); *Y02D 30/70* (2020.08)

(58) Field of Classification Search
USPC .......................................................... 370/329
See application file for complete search history.

(56) References Cited

U.S. PATENT DOCUMENTS

| | | | |
|---|---|---|---|
| 6,646,604 B2 | 11/2003 | Anderson | |
| 6,853,835 B2 | 2/2005 | Wynbeek | |
| 6,867,696 B2 | 3/2005 | Becken | |
| 7,283,475 B2 | 10/2007 | Fortin et al. | |
| 7,362,781 B2 | 4/2008 | Rhoads | |
| 7,415,018 B2 | 8/2008 | Jones et al. | |
| 7,571,269 B2 | 8/2009 | Schmidt et al. | |
| 7,693,191 B2 | 4/2010 | Gorday | |
| 7,715,446 B2 | 5/2010 | Rhoads | |
| 7,813,344 B2 | 10/2010 | Cheswick | |
| 8,027,663 B2 | 9/2011 | Rhoads | |
| 8,081,944 B2 | 12/2011 | Shaolin | |
| 8,325,704 B1 | 12/2012 | Lemkin et al. | |
| 8,848,777 B2 | 9/2014 | Wang | |
| 2002/0141433 A1* | 10/2002 | Kwon ................. | H04L 1/004 370/441 |
| 2003/0039229 A1* | 2/2003 | Ostman ............... | H04L 1/0001 370/335 |
| 2003/0040326 A1 | 2/2003 | Levy et al. | |
| 2003/0076782 A1 | 4/2003 | Fortin | |
| 2003/0084148 A1 | 5/2003 | Cousins | |
| 2003/0091064 A1 | 5/2003 | Partridge | |
| 2003/0097439 A1 | 5/2003 | Strayer | |
| 2003/0203740 A1 | 10/2003 | Bahl | |
| 2004/0001221 A1* | 1/2004 | McCallum ......... | H04N 1/00204 358/1.15 |
| 2004/0059935 A1 | 3/2004 | Cousins | |
| 2005/0054319 A1 | 3/2005 | Tamaki | |
| 2005/0169201 A1 | 8/2005 | Huylebroeck | |
| 2005/0186906 A1 | 8/2005 | Hussmann | |
| 2007/0082647 A1 | 4/2007 | Behzad | |
| 2007/0082715 A1 | 4/2007 | Rofougaran | |
| 2008/0046549 A1 | 2/2008 | Saxena | |
| 2008/0240167 A1 | 10/2008 | Keaney | |
| 2009/0047991 A1 | 2/2009 | Elg | |
| 2010/0003935 A1 | 1/2010 | Behzad | |
| 2010/0067546 A1 | 3/2010 | Mishra | |
| 2010/0079254 A1 | 4/2010 | Koo et al. | |
| 2010/0105346 A1 | 4/2010 | Huang | |
| 2010/0120362 A1 | 5/2010 | Walley et al. | |
| 2010/0271963 A1* | 10/2010 | Koorapaty ............ | H04L 1/0003 370/252 |
| 2010/0202767 A1 | 12/2010 | Shirakawa et al. | |
| 2011/0103338 A1* | 5/2011 | Astely .................. | H04J 11/0069 370/329 |
| 2011/0317600 A1 | 12/2011 | Thomson et al. | |
| 2012/0256009 A1* | 10/2012 | Mucignat ........... | G05D 23/1905 236/1 C |
| 2013/0039239 A1 | 2/2013 | Lin | |
| 2013/0040573 A1 | 2/2013 | Hillyard | |
| 2013/0322313 A1 | 12/2013 | Sikri | |
| 2013/0336188 A1 | 12/2013 | Yomo | |
| 2014/0126442 A1 | 5/2014 | Jafarian | |
| 2014/0146756 A1* | 5/2014 | Sahin .................... | H04L 1/0025 370/329 |
| 2015/0036575 A1 | 2/2015 | Li | |
| 2015/0131708 A1* | 5/2015 | Cornett ............ | H04L 25/03987 375/231 |

OTHER PUBLICATIONS

Berk, Vincent, et al., "Detection of Covert Channel Encoding in Network Packet Delays," Technical Report TR2005-536, Department of Computer Sciences, Dartmouth College, Hanover, NH, Aug. 2005.

Calhoun, Telvis E., et al., "An 802.11 MAC Layer Covert Channel," Wireless Communications and Mobile Computing (2010), Wiley InterScience www.interscience.wiley.com; DOI: 10.1002/wcm.969, Department of Computer Sciences, Georgia State University, Atlanta, GA 30303, USA.

Dye, Derek, "Bandwidth and detection of packet length cover channels," Issue date Mar. 2011, Monterey, California, Naval Postgraduate School, http://hdl.handle.net/10945/5724.

Edwards, Jonathan, "Covert Channels in Ad Hoc Networking: An Analysis Using the Optimized Link State Routing Protocol," A thesis submitted to the Faculty of Graduate and Postdoctoral Affairs in partial fulfillment of the requirements for the degree of Master of Applied Sciences in Electrical Computer Engineering, Carleton University, Ontario, Canada, Apr. 2012.

Girling, Gary, "Covert Channels in LAN's," IEEE Transactions on Software Engineering, vol. SE-13, No. 2, Feb. 1987.

Handel, Theodore, et al., "Hiding Data in the OSI Network Model," Weapon Design Technology Group, Los Alamos, NM 87545, pp. 23-38.

Ji, Liping, et al., "A Novel Covert Channel Based on Length of Messages," 2009 International Symposium on Information Engineering and Electronic Commerce, Harbin Institute of Technology, Shenzhen Graduate School Shenzhen, P.R. China.

Kondo, Yoshihisa, et al., "Wake-up Radio using IEEE 802.11 Frame Length Modulation for Radio-on-Demand Wireless LAN," 2011 IEE 22nd International Symposium on Personal, Indoor and Mobile Radio Communications.

Kratzer, Christian, et al., "WLAN Steganography: A First Practical Reivew," Copyright 2006 ACM 1-59593-493-6060009, Department of Computer Science, Research Group Multimedia and Security, MM & Sec '06, Sep. 26-27, 2006, Geneva, Switzerland.

Lucena, Norka B., et al., "Covert Channels in IPv6," Syracuse University, Syracuse, NY 13244 USA, Copyright 2006, Springer-Verlag Berlin Heidelberg 2006, pp. 147-166.

Padlipsky, M.A., et al., "Limitations of End-to-End Encryption in Secure Computer Networks", Deputy for Technical Operations, Electronic Systems Division, Air Force Systems Command, Hanscom Air Force Base, Massachusetts; Pepared by The Mitre Corporation, Project 672B, Aug. 1978.

Panajotov, Boris, et al, "Covert Channels in TCP/IP Protocol Stack," ICT Innovations 2013 Web Proceedings ISSN 1857-7288, University "Goce Delcev", Faculty of Computer Science, "Krste Misirkov" bb, 2000, Stip, Republic of Macedonia, pp. 190-199.

Scott, Carlos, "Network Covert Channels: Review of Current State and Analysis of Viability of the Use of X.509 Certificates for Covert Communications," Technical Report RHUL-MA-2008-11, Jan. 15, 2008, Royal Holloway University of London, Department of Mathematics, England.

Stelte, Bjom, et al., "Concealed Integrity Monitoring for Wireless Sensor Networks," Wireless Sensor Network, 2011, 3, 10-17, doi: 10.4236/wsn.2011.31002, Published online Jan. 2011, http://www.scirp.org/journal.wsn.

Wolf, Manfred, "Covert Channels in LAN Protocols," Tele-Consulting Gmbh, Germany, pp. 91-101.

Yuan, Bo, et al., "A Covert Channel in Packet Switching Data Networks," Department of Networking, Security and Systems Administration, Rochester Institute of Technology, Rochester, NY 14623.

(56) References Cited

OTHER PUBLICATIONS

Zander, Sebastian, et al., "A Survey of Covert Channels and Countermeasures in Computer Network Protocols," 3rd Quarter 2007, vol. 9, No. 3, IEE Communications Survey, The Electronic Magazine of Original Peer-Reviewed Survey Articles, www.comsoc.org/pubs/surveys.

Zander, Sebastian, "Performance of Selected Noisy Covert Channels and Their Countermeasures in IP Networks," Thesis submitted in accordance with the requirements for the degree of Doctor of Philosophy, Swinburne University of Technology, Melbourne, Australia, Copyright May 2010.

Zhang, Xinyu, et al., "Gap Sense: Lightweight Coordination of Heterogeneous Wireless Devices," University of Wisconsin-Madison and the University of Michigan-Ann Arbor, supported in part by NSF Grant CNS-1160775.

Patent Cooperation Treaty, International Searching Authority, "Notification of Transmittal of the International Search Report and the Written Opinion," PCT Application No. PCT/US16/27280; dated Jul. 15, 2016.

Patent Cooperation Treaty, "International Preliminary Report on Patentability," PCT Application No. PCT/US2014/028889, dated Sep. 15, 2015.

Chinese Intellectual Property Office, Patent Application No. 201480028106.0, English translation of First Office Action dated Jul. 14, 2017.

Chinese Intellectual Property Office, Patent Application No. 201480028106.0, English translation of Third Office Action dated Aug. 16, 2018.

European Patent Office, EP Patent Application No. 14771024.8, Examination Report No. 1, dated Apr. 25, 2017.

European Patent Office, EP Patent Application No. 14771024.8, Examination Report No. 2, dated Feb. 19, 2018.

Korean Intellectual Property Office (KIPO), Patent Application No. 10-2015-7029467, English translation of Office Action, received from Korean associates dated Aug. 21, 2017.

Korean Intellectual Property Office (KIPO), Patent Application No. 10-2015-7029467, English translation of Office Action, received from Korean associates dated Jul. 10, 2018.

\* cited by examiner

METHODS AND APPARATUS FOR NETWORKING USING A PROXY DEVICE AND BACKCHANNEL COMMUNICATION

CROSS-REFERENCE TO RELATED PATENT APPLICATION

This application is a continuation-in-part (CIP) of U.S. patent application Ser. No. 14/213,771, filed Mar. 14, 2014. This application is also a continuation-in-part (CIP) of U.S. patent application Ser. No. 14/880,951, filed Oct. 12, 2015. U.S. patent application Ser. No. 14/213,771 claims priority to and the benefit of U.S. Provisional Application No. 61/782,220, filed Mar. 14, 2013. Each of the foregoing patent applications is incorporated by reference herein in their entirety.

BACKGROUND

Known wireless communication devices such as a typical mobile telephone or a tablet personal computer (PC) each typically includes one of several types of commercial transceiver or radios, such as multi-band cellular, Wi-Fi®, Bluetooth®, and Global Positioning System (GPS). Each of these transceivers includes an integrated circuit (IC), or collection of ICs designed for a specific wireless communication standard (e.g., the Bluetooth® standard). Furthermore, the wireless standards are defined by a group such as the Institute of Electrical and Electronics Engineers (IEEE) (e.g., Wi-Fi®), or by a consortium (e.g., Bluetooth®). Such wireless standards typically have mandatory modes that must be supported by an IC to be considered "compliant" with that standard. Compliance with the standard is used to provide interoperability among devices from different manufactures. Because of the complexity of considered "compliant" with that standard. Compliance with the standard is used to provide interoperability among devices from different manufactures. Because of the complexity of these standards, and the "overhead" circuits used to support at least the mandatory functionality of the standard, transceiver ICs that are standard-compliant typically consume higher power than custom transceivers that do not target any specific standard. For example, a Bluetooth®-compliant transceiver from Texas Instruments (TI) typically consumes >40 mW in the active mode, while a proprietary transceiver from Energy Micro consumes <10 mW.

Any wireless peripheral device such as, for example, a headset or a stereo, that wirelessly connects to a wireless communication device typically does so using one of the wireless connectivity standards the wireless communication device supports (e.g. iPhone®: Wi-Fi® and Bluetooth®; Galaxy SIII®: Wi-Fi®, Bluetooth®, and Near Field Communication). This means the wireless peripheral device typically also uses a standard-compliant IC to provide interoperability between the wireless communication device and the wireless peripheral device. While the wireless communication device can typically be recharged periodically (e.g., nightly), wireless peripheral devices are not recharged as frequently, they typically operate for longer periods of time off a single charge, and they usually are powered by smaller batteries than those in the wireless communication device. Therefore, it is desirable for the power consumption of the transceiver on the wireless peripheral device to be significantly smaller than that of the wireless communication device, and it is desirable for the power consumption on the wireless peripheral device to be adequately managed so as to provide long battery lifetime.

Wireless peripheral devices typically can either set their transceivers into a low-power "sleep" mode, or turn them off entirely, to reduce the power consumption. This is typically referred to as "duty cycling". Problematic situations, however, can arise when a wireless communication device attempts to wirelessly communicate with the wireless peripheral device during such "sleep" and/or "off" modes when the wireless peripheral device's transceiver is powered off and unable to receive messages from the wireless communication device. This presents a tradeoff between the latency in communicating with a wireless peripheral device, and the power consumed by the wireless transceiver on the wireless peripheral device. More frequent turning on of the wireless transceiver leads to lower latency, but higher average power consumption, and vice versa.

Accordingly, a need exists for apparatus and methods that allow a wireless communication device to wirelessly communicate with a wireless peripheral device while the wireless peripheral device is in a low power "sleep" mode, with its main wireless transceiver in the "sleep" or "standby" mode.

DETAILED DESCRIPTION

Embodiments described enable low power wireless devices that are not compliant (or only partially compliant) with one or more standard protocols to communicate with fully compliant wireless devices. In various embodiments, a compliant signal is modulated for transmission to the low power wireless device such that the low power wireless device receives meaningful data without being required to demodulate the protocol. Described herein are methods and apparatus for using "backchannel" communication over standard wireless communication protocols, including wireless protocols that typically send device-to-device communications, and also described are backchannel communication leveraging beacon (also known as broadcast) protocols that typically operate in a contained network environment (e.g. a piconet). The term "backchannel" as used herein, infers using networked processors to maintain a real-time online conversation alongside the primary group activity while not disturbing the primary group activity or conversations that take place according to the standard protocol being used.

Figure 1A:
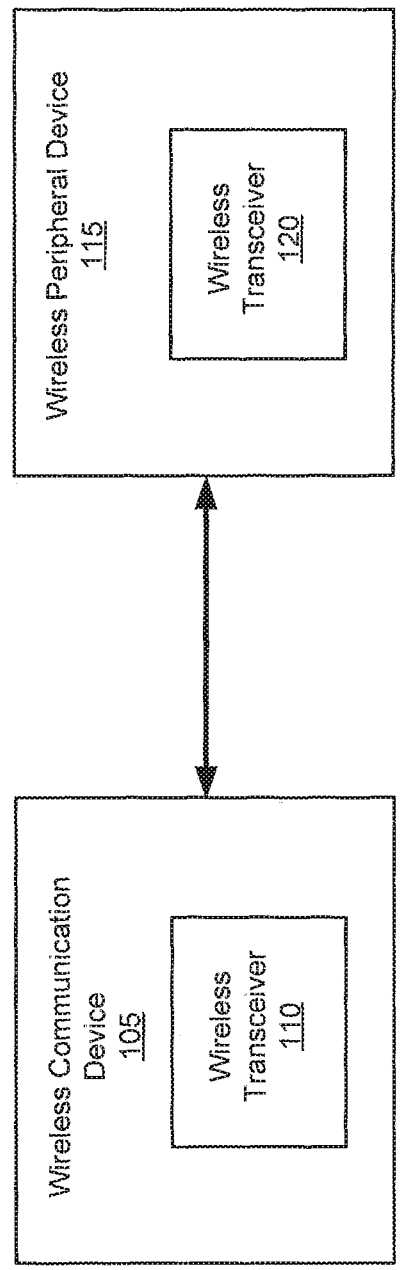
FIG. 1A is a schematic illustration of a communication system that includes a wireless communication device and a wireless peripheral device, according to an embodiment.

Embodiments described include examples of wireless backchannel communication in a general sense (as illustrated and described with reference to FIG. 1A-FIG. 7), and then a more specific application to beacon or broadcast transmissions (for example, in the context of piconets (as illustrated and described with reference to FIG. 8-FIG. 18).
I. Backchannel Communication Described Generally as Illustrated by an Example in a Wireless Network with a Low Power Peripheral Device FIGS. 1A-FIG. 7 illustrate embodiments of an apparatus and method for communication between a protocol compliant wireless device and a non-protocol compliant low power wireless device. FIG. 1A is a schematic illustration of a communication system that includes a wireless communication device and a wireless peripheral device, according to an embodiment. The system 100 includes a wireless communication device 105 in wireless communication with wireless peripheral device 115. Both the wireless communication device 105 and the wireless peripheral device 115 include wireless transceivers that comply with one or multiple standard wireless communication protocols. The wireless communication device 105 can be any access point, such as, for example a Wi-Fi router or ZigBee base station; or 105 can be any mobile wireless communication device such as, for example, a laptop computer, a personal digital assistant (PDA), a standard cellular phone, a smart phone, a tablet personal computer (PC). The wireless communication device 105 includes a (standard protocol compliant) wireless transceiver 110. The wireless transceiver 110 can include one or multiple wireless port(s). The wireless port(s) in the wireless transceiver 110 can send and/or receive wireless signals such as, for example, wireless radio frequency (RF) signals via a variety of wireless communication protocols such as, for example, wireless fidelity (Wi-Fi®) protocol, Bluetooth® 4.0 protocol, cellular protocol (e.g., third generation mobile telecommunications (3G) or fourth generation mobile telecommunications (4G) protocol), 4G long term evolution (4G LTE) protocol), Near Field Communication (NFC) protocol.

The wireless peripheral device 115 can be any wireless peripheral device such as, for example, a headset, a stereo, a computer mouse, an electronic pen or stylus. The wireless peripheral device 115 includes a (standard protocol compliant) wireless transceiver 120. The wireless transceiver 120 can include one or multiple wireless port(s). The wireless port(s) in the wireless transceiver 120 can send and receive wireless signals via a variety of wireless communication protocols such as, for example, wireless fidelity (Wi-Fi®) protocol, Bluetooth® 4.0 protocol, cellular protocol (e.g., third generation mobile telecommunications (3G) or fourth generation mobile telecommunications (4G) protocol), 4G long term evolution (4G LTE) protocol), Near Field Communication (NFC) protocol.

Although not shown in FIG. 1A, any number of communication networks can be operatively coupled to the wireless communication device 105 to allow wireless communication device 105 to communicate with other wireless and/or wired communication devices. For example, such communication networks can be any type of network (e.g., a local area network (LAN), a wide area network (WAN), a virtual network, and a telecommunications network implemented as a wired network and/or wireless network. As described in further detail herein, in some embodiments, for example, the wireless communication device 105 can be connected to the wireless peripheral device 115 and/or any other device via the communication network that can include an intranet, an Internet Service Provider (ISP) and the Internet, a cellular network.

In the configuration shown in FIG. 1A, the wireless communication device 105 can establish a wireless communication session with the wireless peripheral device 115 via any of the wireless communication standards discussed above. Each of the wireless transceiver 110 and the wireless transceiver 120 includes a wireless transmitter circuit that is designed to enable communication via one or more of the specific standard wireless communication protocols such as the standard wireless communication protocols discussed above. Such wireless standard protocols typically have mandatory modes that are supported for an IC to be considered "compliant" with that standard. Because of the high complexity of such wireless communication standards, significant "overhead" circuitry is typically included in the ICs that are used to support the standard-compliant functionality. Hence, such wireless transceiver ICs that are wireless standard-compliant typically consume a significant amount of power even when the wireless communication device 105 and/or the wireless peripheral device 115 is in an "inactive" or "sleep" mode. This can be problematic especially for the case of wireless peripheral devices 115 that are not recharged frequently, and typically operate for long periods of time by drawing power from small batteries.

Wireless peripheral device 115 includes an ultra-low power (ULP) wireless transceiver (e.g., an ultra-low power radio) that is not necessarily completely compliant with a standard wireless communication protocol, and yet is still capable of receiving a subset of specific messages from the wireless communication device's (compliant) wireless transceiver. As a result, this ULP wireless transceiver consumes much less power than a full standard-compliant wireless transceiver, thus extending the battery and operational lifetime of the wireless peripheral device.

Figure 1B:
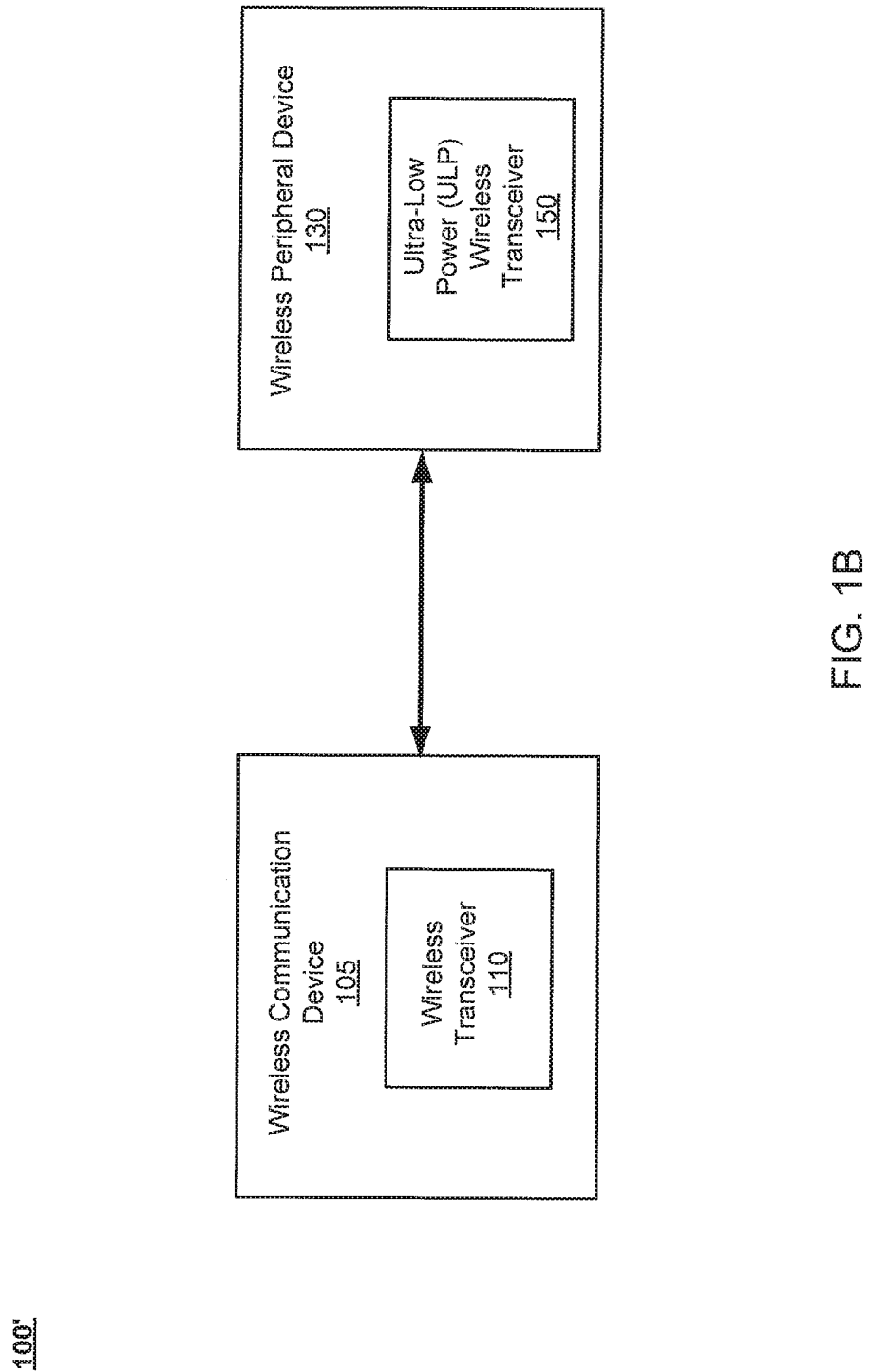
FIG. 1B is a schematic illustration of a communication system that includes a wireless communication device and a wireless peripheral device having an ultra-low power (ULP) wireless transceiver, according to an embodiment.
Figure 2:
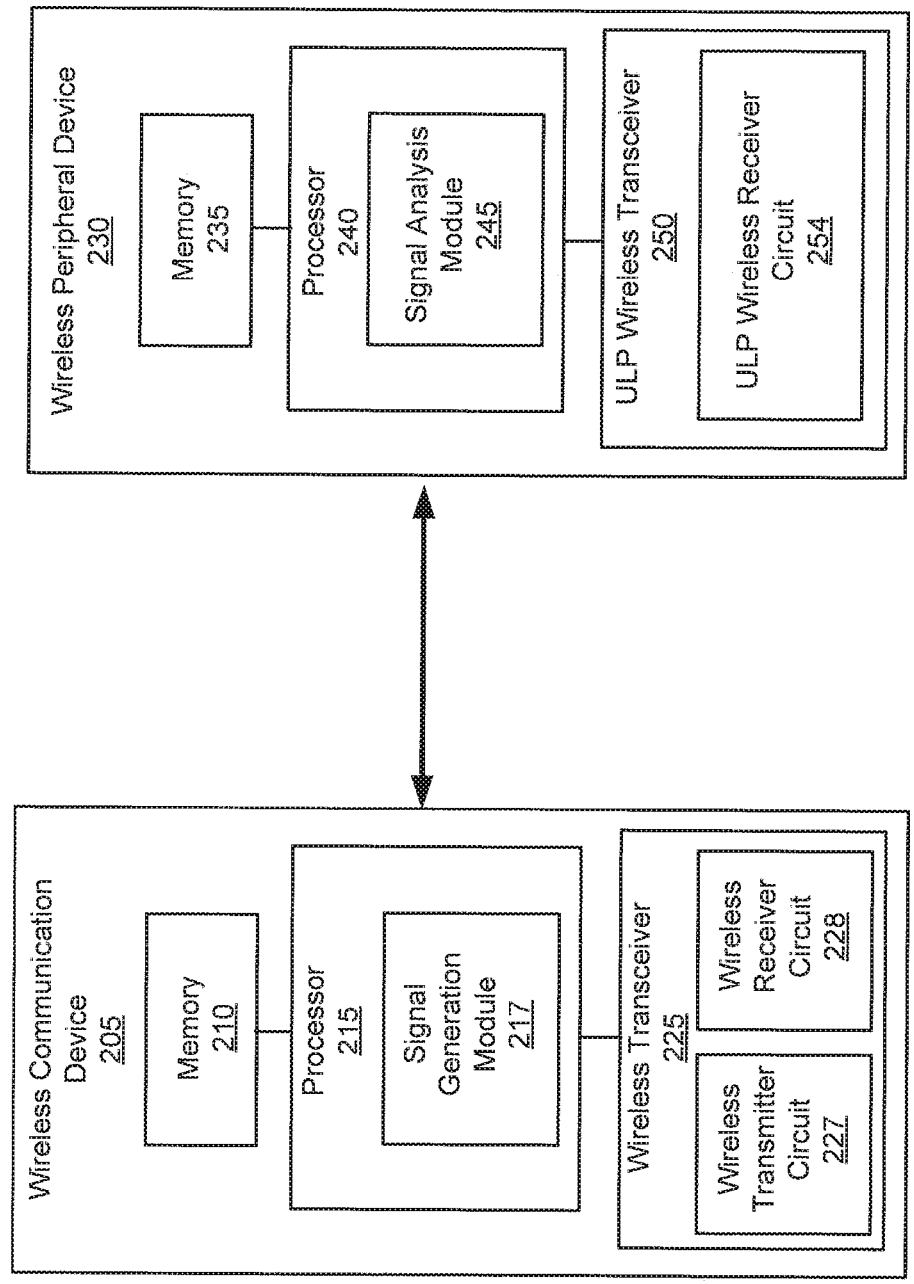
FIG. 2 is a schematic illustration of an asymmetric communication system that includes a wireless communication device and a wireless peripheral device, according to an embodiment.

FIG. 1B is a schematic illustration of a communication system that includes a wireless communication device and a wireless peripheral device having an ultra-low power (ULP) wireless transceiver, according to an embodiment. The system 100' includes a wireless communication device 105 and a wireless peripheral device 130. The wireless communication device 105 includes a wireless transceiver 110 that is fully compliant with one or more of the standard wireless communication protocols. The wireless peripheral device 130 includes an ultra-low power (ULP) wireless transceiver 150 that is not fully compliant with one or more of the standard wireless communication protocol(s) discussed above, yet able to communicate in a backchannel FIG. 2 is a schematic illustration showing more detail of the configuration of FIG. 1B. The communication system 200 includes a wireless communication device 205 in wireless communication with wireless peripheral device 230. The wireless communication device 205 includes a wireless transceiver 225 that complies with one or multiple standard wireless communication protocols, and the wireless peripheral device 230 includes an ULP wireless transceiver 250 that does not fully comply with the standard wireless communication protocol(s) used by the wireless communication device 205.

The wireless communication device 205 is similar to the wireless communication device 105 shown in FIG. 1B and can be any mobile wireless communication device such as, for example, a laptop computer, a personal digital assistant (PDA), a standard cellular telephone, a smart phone, a tablet personal computer (PC), and/or so forth. The wireless communication device 205 includes a memory (or data storage device) 210, a processor 215, and a wireless transceiver 225. Wireless transceiver 225 includes a wireless transmitter circuit 227 and wireless receiver circuit 228.

In an embodiment, the processor 215 executes a signal generation module 217, which facilitates backchannel communication as described herein. As further explained with reference to other embodiments, it is not necessary for a signal generation module to reside on the wireless communication device, but it is one implementation.

The wireless transceiver 225 can include a wireless transmitter circuit 227 and a wireless receiver circuit 228. The wireless transmitter circuit 227 can include one or multiple wireless port(s). The wireless port(s) in the wireless transmitter circuit 227 can send data units (e.g., data packets, data frames, etc.) via a variety of standard wireless communication protocols such as, for example, a wireless fidelity (Wi-Fi®) protocol, a Bluetooth® 4.0 protocol, a cellular protocol (e.g., a third generation mobile telecommunications (3G) or a fourth generation mobile telecommunications (4G) protocol), 4G long term evolution (4G LTE) protocol), a Near Field Communication (NFC) protocol, and/or the like. The wireless transmitter circuit 227 can send to the ULP wireless receiver circuit 254 a wireless signal containing the encoded first information and having changes of a characteristic that represent a second information mutually exclusive from the first information (encoded by the signal generation module 217).

The wireless receiver circuit 228 can include one or multiple wireless port(s). The wireless port(s) in the wireless receiver circuit 228 can receive data units (e.g., data packets, data frames, etc.) via a variety of standard wireless communication protocols such as, for example, a wireless fidelity (Wi-Fi®) protocol, a Bluetooth® 4.0 protocol, a cellular protocol (e.g., a third generation mobile telecommunications (3G) or a fourth generation mobile telecommunications (4G) protocol), 4G long term evolution (4G LTE) protocol), a Near Field Communication (NFC) protocol, and/or the like. The wireless receiver circuit 228 can have a net power gain of no more than unity before at least one of a downconversion of the RF wireless signal or detection of the RF wireless signal.

The wireless peripheral device 230 can be any wireless peripheral device such as, for example, a headset, a stereo, a computer mouse, an electronic pen or stylus, and/or the like. The wireless peripheral device 230 includes a memory (or data storage device) 235, a processor 240, and an ultra-low power (ULP) wireless transceiver 250.

The processor 240 includes a signal analysis module 245. The signal analysis module 245 can be a hardware module and/or software module (that is stored in memory 235 and/or executed in processor 240) and is operably coupled to the ULP wireless transceiver 250. The signal analysis module demodulates the backchannel information that is transmitted on the compliant signal.

The ULP wireless transceiver 250 includes a ULP wireless receiver circuit 254 with one or more wireless ports.

A fully standard wireless communication protocol-compliant wireless transceiver is typically used to generate, transmit, receive, and demodulate data units (e.g., data packets, data frames, etc.) that comply with a specific standard wireless communication protocol. Data units are the primary vehicle for wirelessly transmitting user data or messages from one communication device to another. For example, the audio data exchanged between a cellular phone and a wireless headset is carried in the payloads of multiple data units. The primary goal of these transceivers is to transfer the data contained in the payload (the first information) from the transmitting device to the receiving device. The methods and apparatus of described herein of encoding information through a characteristic of the standard-compliant packet. For example, one characteristic of the standard-compliant packet is its length. The length varies as a function of the amount of data in the payload of the packet. Therefore, controlling the variation of this length can be used to encode information. The wireless transceiver can vary the amount of data put in the packet based on the second information to be encoded. Therefore, the second information is encoded in the length of the packet, and decoded by an ULP receiver circuit that measures the length of the packet, and need not necessarily decode the first information contained in the packet payload. The power consumption of a receiver circuit to measure the packet length (without decoding the first information) can be much lower power than a fully standard-compliant transceiver.

Known wireless transceivers support several modes of operation, referred to as "states" or "modes." The wireless communication device (e.g., a cellular phone, a smart phone, a personal digital assistant (PDA), a tablet personal computer (PC), etc.) controlling a wireless transceiver (e.g., a radio) can direct the wireless transceiver to enter a certain state, or the wireless transceiver may transition between states automatically according to policies outlined in the standard wireless communication protocol. In any given operating state, the wireless transceiver can transmit data units that take on a state-specific structure, or the wireless transceiver can modify the rate at which data units are transmitted or the channel center frequency on which the data units are transmitted or, in some instances, the wireless transceiver may not transmit any data units (e.g., a power-down state). The following discussion relates to apparatus and methods to include and/or modulate a digital message via the higher-level operating states of a wireless transceiver. The following sub-sections describe examples of the modulation formats.

On-Off Keying Modulation by Turning a Radio on/Off

Initially, when the wireless transceiver is not in use, the wireless transceiver is in the "standby" mode or a "sleep" mode. The "standby" mode refers to a low power mode for the wireless transceiver that typically can save significantly on electrical power consumption compared to leaving the wireless transceiver in the "active" or "on" mode. Additionally, when the wireless transceiver is turned on from a "standby" mode, the device controlling the wireless transceiver can avoid having to reissue instructions or to wait for a reboot.

Turning on the wireless transceiver immediately puts the wireless transceiver into a "scan" mode in which scan data units (e.g., data packets) are transmitted. Turning the wireless transceiver off ceases all transmissions. By turning the wireless transceiver on/off with a specific timing sequence, a message can be encoded into the on/off pattern that is observed by an ULP wireless transceiver that only detects the presence/absence of transmitted data units. This technique resembles on/off keying (OOK) modulation, except that the individual symbols are represented by the on/off state of the standard (commercial) the wireless transceiver that is fully compliant with a standard wireless communication protocol. In one example of this technique, this is analogous to Morse code communication where "dashes" and "dots" are encoded by the length of time a wireless transceiver is left on and in the scan mode each time the wireless transceiver is turned on. By using an ULP receiver circuit that can detect the presence of a packet, it can decode the information.

It is also understood that the same effect of modulating the on/off state of a wireless transmitter can be accomplished a variety of different ways, not just by strictly changing the "state" of the transmitter. This can include, for example, changing the settings in the transceiver circuit (by reprogramming software or changing hardware), changing enable states of external components to the transceiver (such as an external power amplifier or a transmit/receiver switch), etc.

Packet-Length Modulation

Wireless transceivers typically use variable length data units, where the length of the data unit varies and depends on the amount of data that is included in the payload of the data unit. Hence, information can be encoded in the length of a data unit. For example, the wireless communication device (e.g., a cellular phone) could generate a sequence of data units containing dummy data in their payloads that, for example, can alternate between minimal length and maximum length, in a pattern that encodes a specific message. The message can be demodulated by using an ULP wireless transceiver that can detect the data unit length without demodulating the contents of the data unit. By using an ULP receiver circuit that can detect the presence of a packet and measure its length, or the length of a series of packets, the ULP receiver circuit can decode the information.

It is also understood that the length of transmission can be modulated in a variety of ways, not just by changing the length of the data unit. A series of packets can also be considered together as one transmission with a length represented by the series of packets, and changing the number of packets in the series therefore changes this length.

Packet-Position Modulation

Data units (e.g., data packets, data frames, etc.) are typically transmitted immediately when there is data to be sent by the wireless transceiver, often times according to a timing protocol defined by the wireless standard. Therefore, a device controlling the wireless transceiver could trigger the generation of a data unit by sending dummy data to the wireless transceiver. Information could be encoded by, for example, sending dummy data to the wireless transceiver at very specific instants in time, generating data units at these instants in time, in a pattern that encodes a specific message. The message could be demodulated by using an ULP wireless transceiver that can detect the presence of data units and can measure the relative time that the data units arrive, without demodulating the contents of the data unit. By using an ULP receiver circuit capable of detecting the time at which a packet arrives, the ULP receiver circuit can decode the second information.

It is understood that the wireless transceiver could alter the transmission times of packets in a number of ways including, for example, by changing the scheduling of packets in a time division multiple access framework, or by altering the delay of a transmission through software or hardware (where the hardware could be external to the wireless transceiver).

Packet-Rate Modulation

In some modes of operation, a wireless transceiver can periodically transmit broadcast data units requesting other wireless peripheral devices respond with their current status. The rate of this broadcast is a parameter that can be configured. Information could be encoded in the rate at which these broadcast data units are transmitted. For example, a wireless communication device (e.g., a cellular phone) could, for example, alternate between broadcasting at the minimum rate and maximum rate, in a pattern that encodes a specific message. The message could be demodulated by using an ULP wireless transceiver that can detect the rate at which data units are transmitted, without demodulating the content of the data units. By using a ULP receiver circuit that can detect the presence of a packet and measure the rate at which packets are received, the ULP receiver circuit can decode the information.

It is also understood that the packet rate can be changed in a variety of ways, not specifically for devices that have a broadcast mode.

Channel-Modulation

Wireless transceivers typically operate on one of several channels, or may include frequency-hopping in which the wireless transceiver channel is changed frequently to spread the communication over a wide range of frequencies (i.e., improving diversity and reliability of communication). Information can be encoded by, for example, directing the wireless transceiver to switch between specific channels, or switch between different hopping sequences, in a pattern that encodes a specific message. The message could be demodulated by using an ULP wireless transceiver that can detect the channel at which a data unit was transmitted on, without demodulating the contents of the data unit. By using an ULP receiver circuit that can detect the presence of packets and the channel they are transmitted on, the ULP receiver circuit can decode the information.

Amplitude Modulation (AM)

A wireless transceiver typically has the ability to control the output power of the power amplifier (PA). The transceiver can encode information into the output power level used by the PA. This can be accomplished, for example, in software (executing on a processor) by changing settings of the transceiver or external power amplifier. Alternatively, this can be accomplished in hardware by changing or having a different circuit, attenuation level, or external switch settings. An ULP receiving circuit could measure the received power levels of a series of packets, and by differentiating between the two levels decode the secondary information.

Modulate Contents of the Packet

A wireless transceiver typically has the ability to control the information that is used in the different sections of a packet it is transmitting. For example, it can control the destination address, the data in the payload, etc. Normally this data is assumed to be random, and in many cases a scrambler is used in the wireless transceiver as specified by a standard to ensure the transmitted signal characteristics (e.g. its frequency response) appear random. If the contents of the packet (e.g. payload data), however, are given a very specific value, the transmitted signal will have a detectable characteristic, such as a certain pattern in the frequency- or time-domain. Different packet contents therefore produce changes in these characteristics. Therefore, in this embodiment, the wireless transceiver can encode secondary information into very specific packet content to produce a predefined sequence of changes in the signal characteristics, which may then be detected and decoded by an ULP wireless receiving circuit.

Specific Example Using Bluetooth® 4.0 Standard

Figure 3:
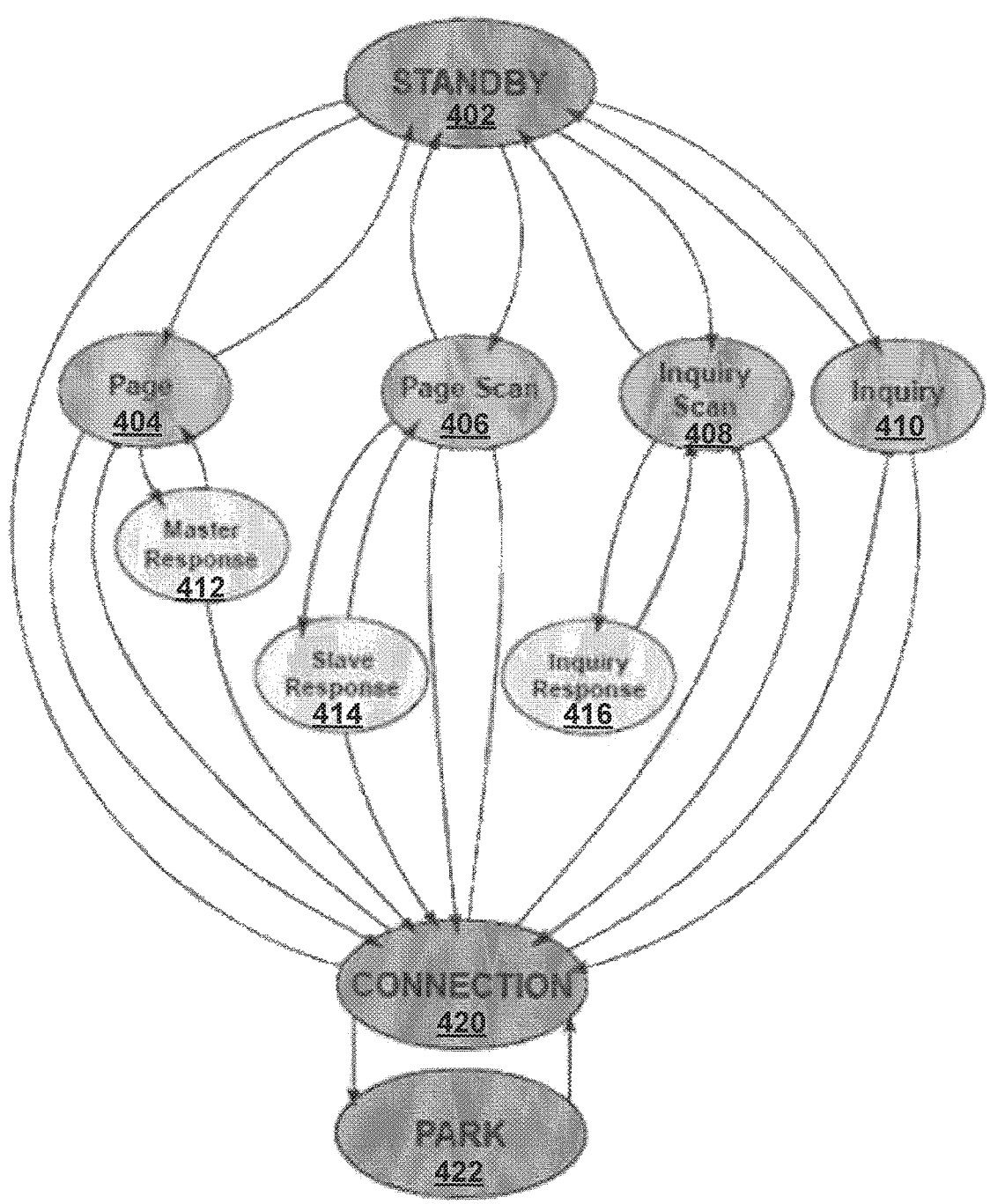
FIG. 3 is a state diagram that illustrates a method of communication of a Bluetooth® compliant wireless transceiver, according to an embodiment.

FIG. 3 is a state diagram that illustrates a method of communication 400 of a Bluetooth® compliant wireless transceiver, according to an embodiment. The method of communication 400 described in FIG. 3, however, could be more broadly applied to a wireless transceiver that is compliant with any other standard wireless communication protocol besides Bluetooth®. According to the Bluetooth® 4.0 standard, every Bluetooth® compliant wireless transceiver is configured to support several mandatory modes and states of operation. The mandatory modes and states of operation as illustrated in FIG. 3 are described in detail in the Bluetooth® 4.0 Standard Document entitled "Specification of the Bluetooth® System", version 4.0, volume 0, dated Jun. 30, 2010, the disclosure of which is incorporated herein by reference in its entirety.

Each mode and state shown in FIG. 3 has a specific function. For example, the STANDBY state 402 is the default, low-power state where the wireless transceivers are off (nothing transmitted or received), and only a timer may be active in the Bluetooth® wireless transceivers. From the STANDBY state 402, the wireless transceiver may only transition into either the PAGE states (e.g., page state 404, page scan state 406) or the INQUIRY states (e.g., inquiry scan state 408, inquiry state 410). In the PAGE or INQUIRY states, the master Bluetooth® wireless transceiver (e.g., the wireless transceiver 225 shown in FIG. 2) enters a scanning mode during which the master Bluetooth® wireless transceiver can search for new wireless devices with which to pair (INQUIRY), or solicit information about previously paired devices (PAGE). The process of PAGING and INQUIRY for a new wireless device can involve one or multiple transitional states such as, for example, a master response state 412, a slave response state 414 where a slave is defined as a new (fully compliant or partially compliant) Bluetooth® device (e.g., the ULP wireless transceiver 250 shown in FIG. 2) different from the master Bluetooth® wireless transceiver, an inquiry response state 416. If as a result of the PAGE or INQUIRY states of the master Bluetooth® wireless transceiver, any new wireless device is discovered, the master Bluetooth® wireless transceiver synchronizes to the slave Bluetooth® device so communication can be established between the master Bluetooth® wireless transceiver and the slave Bluetooth® wireless transceiver, after which the two wireless transceivers (both master and slave) can transition to the CONNECTION state 420. In the CONNECTION state 420, data units are exchanged such as streaming digital voice to/from a headset or data files to a Bluetooth® peripheral device (e.g., wireless peripheral device 230 as seen in FIG. 2). This can be referred to as normal Bluetooth® operation, where data is exchanged in data units (e.g., data packets, data frames, etc.) in each of the states according to the Bluetooth® standard. If the CONNECTION state 420 successfully transmits data units wirelessly between the master Bluetooth® wireless transceiver and the slave Bluetooth® wireless transceiver for a pre-specified time period, a persistent wireless link (or connection) will be established between the master Bluetooth® wireless transceiver and the slave Bluetooth® wireless transceiver, and the master Bluetooth® wireless transceiver enters into a PARK state 422.

In some configurations described herein, wireless communication between a master Bluetooth® wireless transceiver and slave Bluetooth® wireless transceiver can be achieved by encoding user data into a sequence of state changes. This is in contrast with encoding user data into the payload of a data unit, as specified by the Bluetooth® standard.

Figure 4:
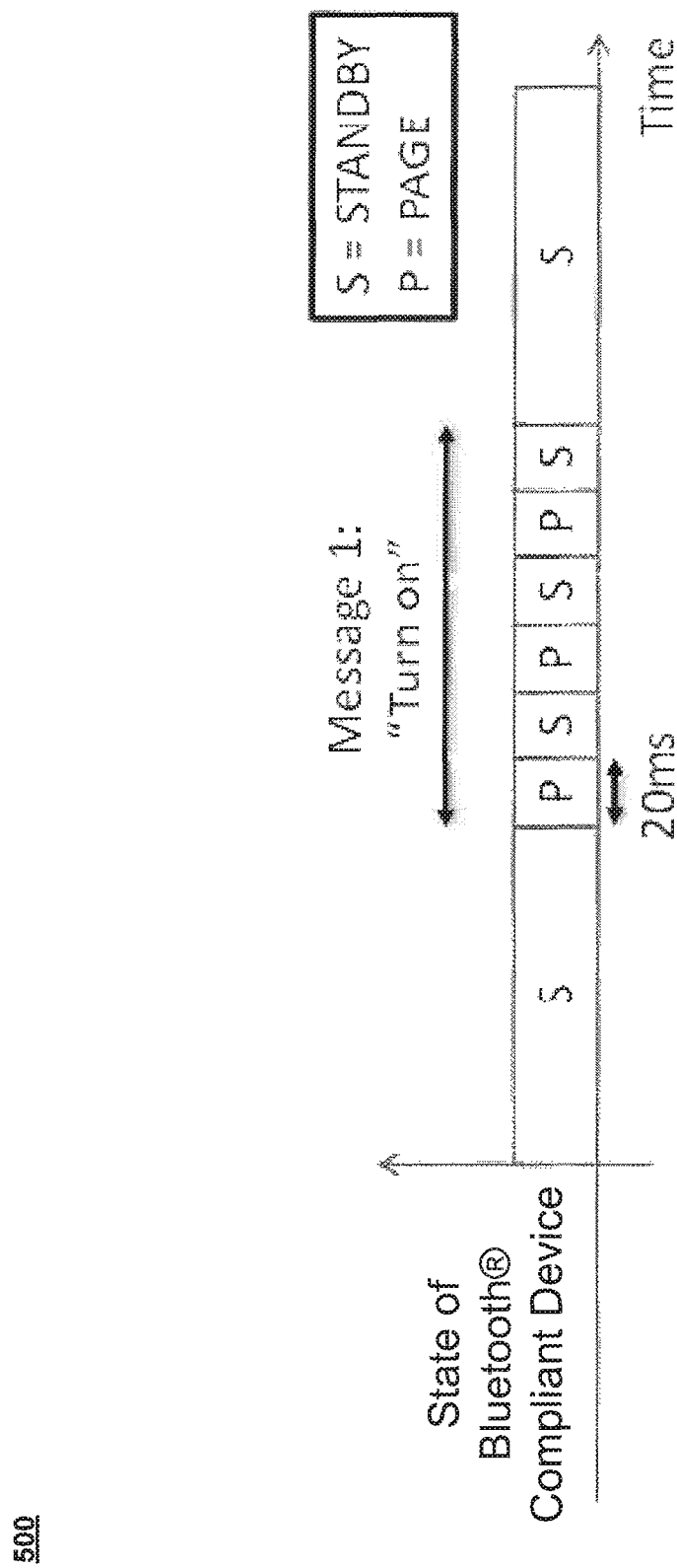
FIG. 4 shows an example of encoding a message in the transitions between states of a Bluetooth® compliant device supporting mandatory standby and page modes, according to an embodiment.

FIG. 4 shows an example of encoding a message in the transitions between states of a Bluetooth® compliant device supporting mandatory standby and page modes, according to an embodiment. The Bluetooth® compliant device can be, for example, the master Bluetooth® wireless transceiver discussed in FIG. 3. Referring to FIGS. 3 and 4, if the master Bluetooth® wireless transceiver is transitioned rapidly between the STANDBY state 402 and PAGE states (404 and/or 406) at an interval of 20 ms, a unique transmitted signal 500 is produced from the master Bluetooth® wireless transceiver. This unique transmitted signal could be recognized by a slave Bluetooth® wireless transceiver (e.g., wireless peripheral device 230 as seen in FIG. 2) and interpreted as a message such as, for example, "turn on". Changing the interval time could be used to denote a set of messages or to address different devices. For example, 20 ms intervals between state changes could encode the message "turn on device 1" and 30 ms intervals the message "turn on device 2", etc. A Bluetooth® compliant wireless transceiver (e.g., a Bluetooth® compliant radio) typically does not transition between these states at the above mentioned intervals under normal operating conditions; therefore these messages would be recognized as unique. Furthermore, the message encoded into state changes uses states existing in the Bluetooth® standard, therefore any Bluetooth®-compliant master device could send such messages. In another configuration, data can be encoded by transitioning a wireless transceiver between the "standby" and "active" states.

Figure 5:
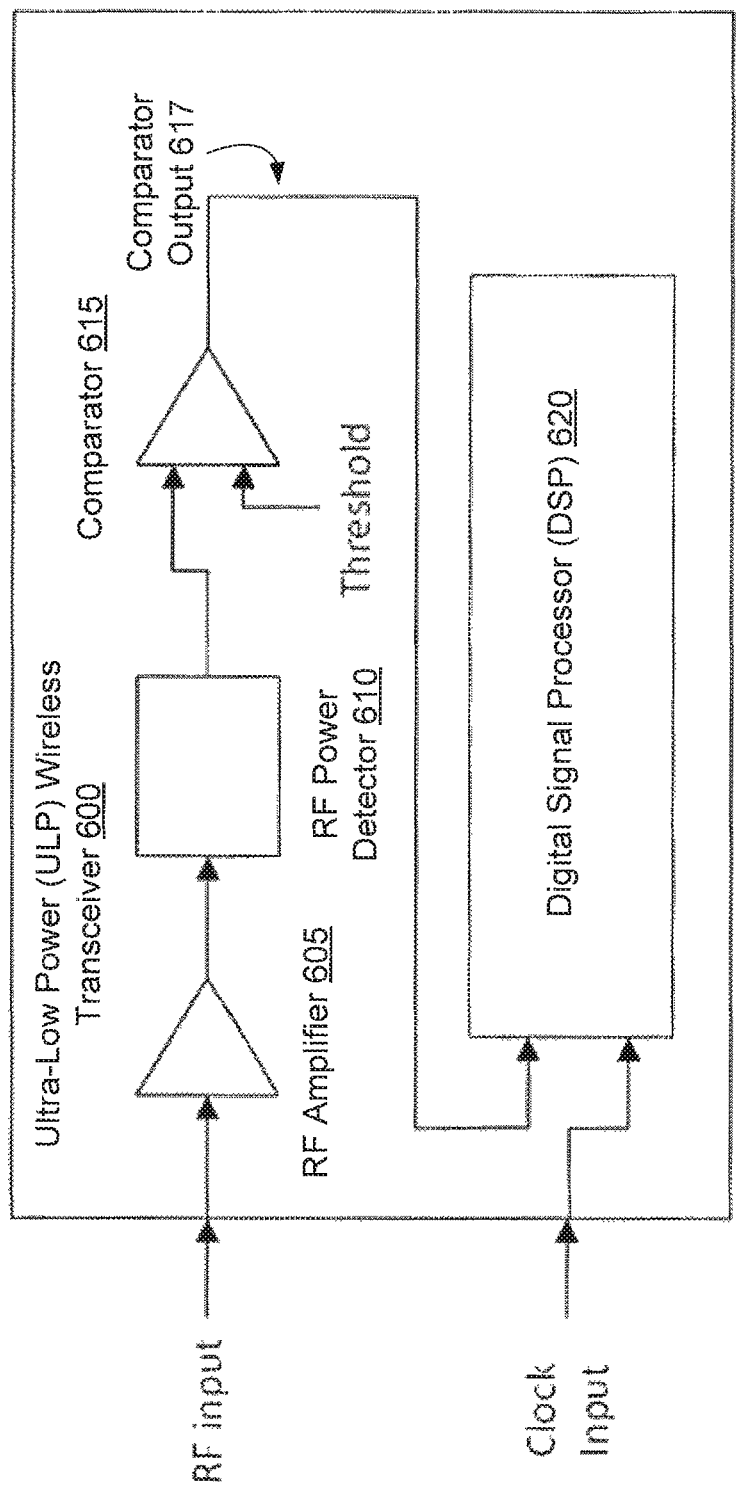
FIG. 5 is a system block diagram of an ultra-low power (ULP) wireless transceiver, according to an embodiment.

FIG. 5 is a system block diagram of an ultra-low power (ULP) wireless transceiver, according to an embodiment. The ULP wireless transceiver 600 first amplifies at the RF amplifier 605, the wireless (RF) input signal sent from a wireless transceiver, and then measures the power level of the received wireless (RF) signal at an RF power detector

610 (e.g., a peak-detector circuit). The RF power detector 610 outputs an electric voltage that is proportional to the magnitude of the RF signal that arrived at the input terminal of the RF power detector 610. The output voltage from the RF power detector 610 is compared to a threshold voltage in an analog comparator 615. The threshold voltage can be a predetermined voltage level that is representative of adequate communication between the two wireless transceivers discussed above. In some instances, when the received power is above the threshold value, the comparator 615 outputs a logical "1". In other instances, when the received power is below the threshold value, the comparator 615 outputs a logical "0". The output of the comparator 615 can be used for communication from a wireless communication device (e.g., a cellular phone that includes a Bluetooth®-compliant wireless transceiver) to the wireless peripheral device (that includes a ULP radio transceiver 600) in the following way.

When the wireless communication device configures its wireless transceiver in the "standby" state, no wireless data units are transmitted by the wireless communication device and the comparator output 617 on the ULP wireless transceiver 600 is a "0". When the wireless communication device configures its wireless transceiver to the "active" mode, the wireless communication device begins transmitting data units wirelessly according to the standard wireless communication protocol. The ULP wireless transceiver 600 detects the presence of the data units by measuring an increase in the RF power level, and outputs a "1". This forms the basic method for communication from the wireless communication device to the wireless peripheral device.

A message or data that is transmitted from a wireless communication device can be received at the wireless peripheral device using the ULP wireless transceiver 600 described above. A digital signal processor (DSP) 620 located after and receiving the comparator output 617 of the ULP wireless transceiver 600 can perform message decoding capable of identifying patterns in the comparator output 617. The wireless communication device begins transmitting a message by, for example, transitioning its wireless transceiver between the "active" and "standby" states at a regular interval. The DSP 620 on the ULP wireless transceiver 600 detects alternating "0" and "1" on the comparator output 617 and compares this comparator output 617 to a reference clock (not shown) on the ULP radio receiver. The ULP wireless transceiver 600 then synchronizes its local clock to the incoming bit sequence, producing a "synchronized clock" locally on the ULP wireless transceiver 600 that can later be used to demodulate the incoming wireless data units. After a predefined number of cycles alternating between "active/standby" states, the wireless communication device begins encoding data to be sent to the wireless peripheral device. At the same regular interval, the wireless communication device transitions its wireless transceiver to the "active" state when a "1" is to be transmitted, and to the "standby" state when a "0" is to be transmitted. The DSP 620 on the ULP wireless transceiver 600 then monitors the comparator output 617, and records the value of the comparator output 617 at every interval of the synchronized clock in, for example, a memory (not shown in FIG. 5). At every rising edge of the synchronized clock, either a "0" or a "1" will be sampled by the DSP 620 and recoded in the memory. The recoded message can then be decoded and output by the DSP 620 (not shown in FIG. 5). For example, in some instances, the message decoding can be based on the pulse width of the "1" sample values from the comparator output 617. Based on this output, further action can be taken by the ULP wireless transceiver 600 or the wireless peripheral device if necessary or appropriate.

The wireless communication device can communicate to the ULP wireless transceiver 600 on the wireless peripheral device by using a standard wireless communication protocol compliant transceiver without any modification to the wireless communication device hardware. Therefore, the control of the wireless transceiver (located in the wireless communication device) to encode and transmit a message to the ULP wireless transceiver 600 can be performed entirely in software on the wireless communication device (also referred to herein as "control software"). This control software can be stored in a memory of the wireless communication device (e.g., memory 210 in FIG. 2) and/or executed in a processor of the wireless communication device (e.g., processor 215 in FIG. 2). The method by which the wireless communication device controls its wireless transceiver through its control software is dependent on the wireless communication device, wireless communication device operating system, and level of control allowed by permissions settings of the wireless communication device. The control software can be written or configured specifically to control the state of the wireless transceiver, transitioning it, for example, between "active" and "standby" states at specific times. This is analogous to transitioning the wireless communication device into and out of "airplane mode," but doing so periodically and at controlled instants in time.

Figure 6:
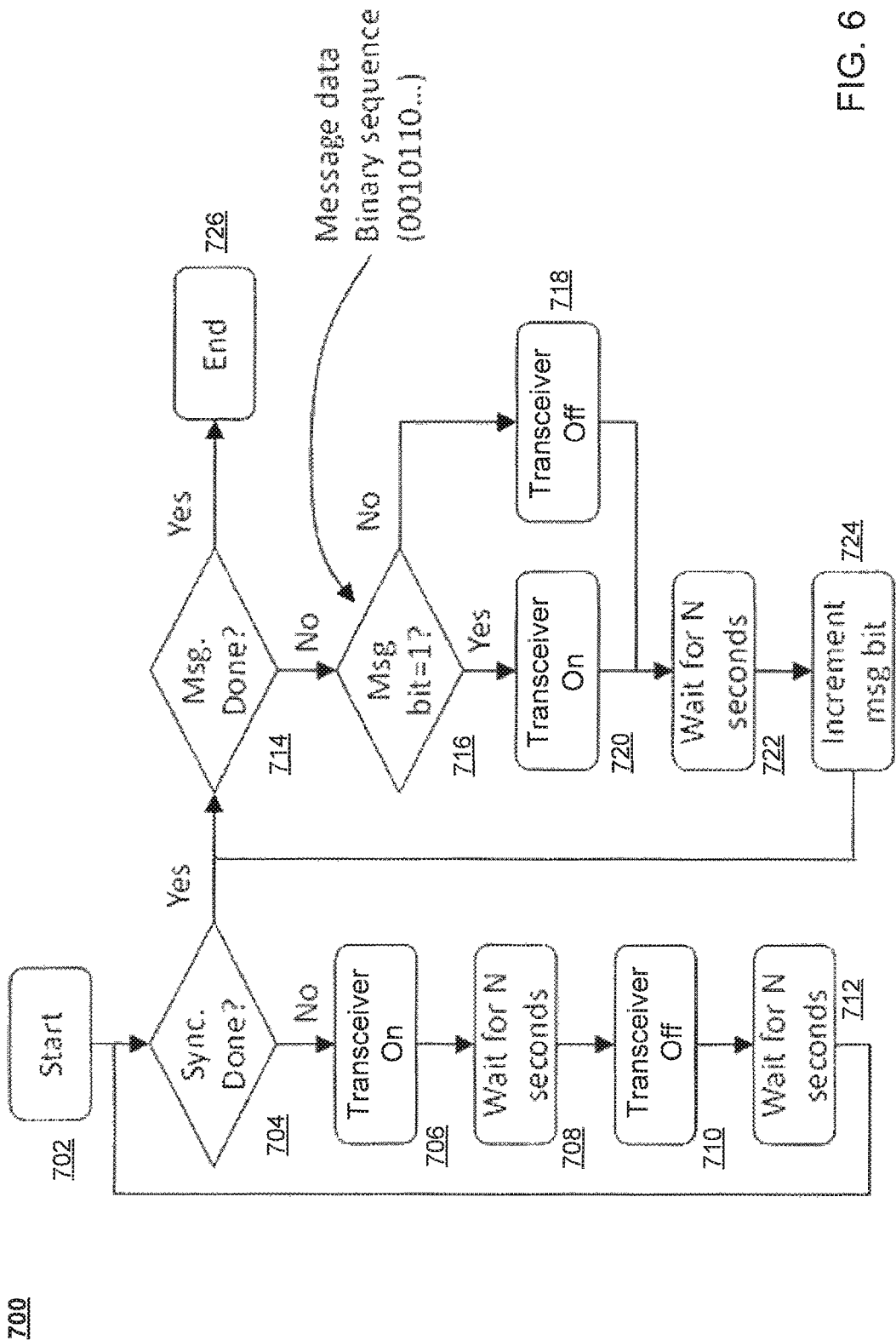
FIG. 6 is a flowchart illustrating a method by which the control software executed by a wireless communication device can communicate with an ULP wireless transceiver, according to an embodiment.

FIG. 6 is a flowchart illustrating a method by which the control software executed by a wireless communication device can communicate with an ULP wireless transceiver, according to an embodiment. The method 700 includes the control software starting a communication session with the ULP wireless transceiver, at 702. Between steps 704-712, the control software transitions the ULP wireless transceiver between on and off modes, for example, for a fixed number of cycles and at a periodic rate, to provide a synchronization sequence to which the ULP wireless transceiver can synchronize its local clock.

After provisioning the synchronization sequence, between steps 714-724, the control software begins modulating the message to be transmitted onto the on/off state of the wireless transceiver (located in a wireless communication device) at the same rate by only turning the wireless transceiver on when a "1" data bit is to be transmitted and turning the wireless transceiver off to transmit a "0" data bit. The control software continues the steps 714-724 until the entire message has been transmitted. The control software can alternatively modulate the message data by varying the transmit power level of the wireless transceiver, rather than its on/off state, which can be controlled via the control software with no required changes to the wireless communication device hardware. After the desired message has been transmitted to the ULP wireless transceiver, the control software can end the transmission of the message by bringing the wireless communication device to an "off" or a "standby" state, at 726.

Figure 7:
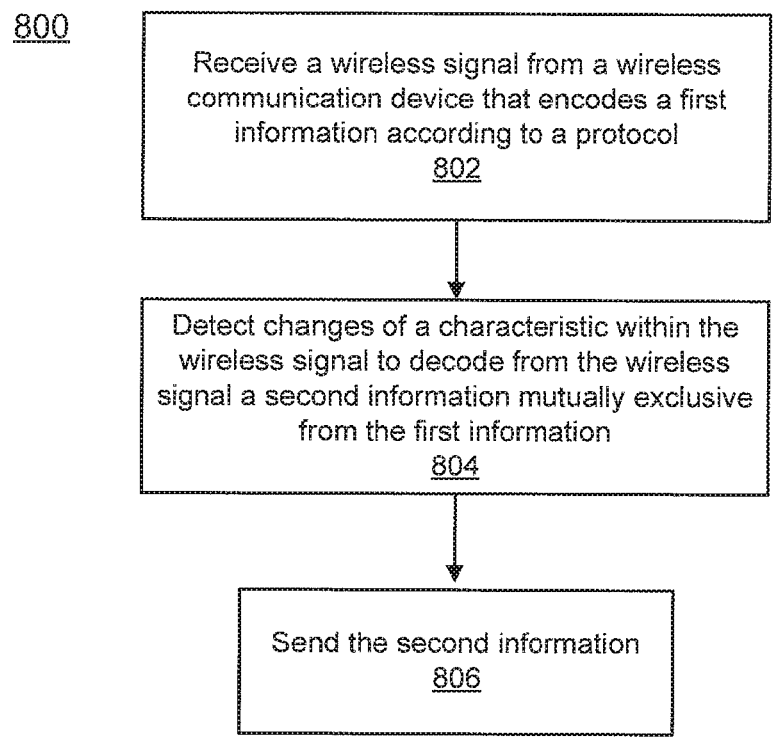
FIG. 7 is a flowchart illustrating a method by which an ULP wireless transceiver can communicate with a wireless communication device, according to an embodiment.

FIG. 7 is a flowchart illustrating a method by which a ULP wireless transceiver can communicate with a wireless communication device, according to an embodiment. The method 800 includes receiving at, for example, a wireless peripheral device that includes a wireless receiver circuit of the ULP wireless transceiver, a wireless signal from a wireless communication device, at 802. As described above, the wireless communication device can be any mobile wireless communication device such as, for example, a laptop computer, a personal digital assistant (PDA), a standard cellular phone, a smart phone, a tablet personal computer (PC), and/or so forth. The wireless communication device is separate from the wireless receiver circuit of the ULP wireless transceiver and encodes a first information according to a protocol in the wireless signal. The wireless communication device can send the wireless signal according to any standard wireless communication protocol such as, for example, wireless fidelity (Wi-Fi®) protocol, Bluetooth® 4.0 protocol, cellular protocol (e.g., third generation mobile telecommunications (3G) or fourth generation mobile telecommunications (4G) protocol), 4G long term evolution (4G LTE) protocol), Near Field Communication (NFC) protocol, and/or the like. As described above, the wireless peripheral device can be any wireless device such as, for example, a headset, a stereo, a computer mouse, an electronic pen or stylus, and/or the like. The wireless receiver circuit of the ULP wireless transceiver is not fully compliant with one or more of the standard wireless communication protocol(s) discussed above.

At 804, a pre-defined sequence of changes of a characteristic within the wireless signal can be detected by, for example, the wireless receiver circuit of the ULP wireless transceiver, to decode a second information mutually exclusive from the first information without decoding the first information. As described above, the second information can be representative of, for example, transitions between operating states of the wireless communication device (e.g., a timing sequence) that can indicate a message to the wireless peripheral device (e.g., a "wake-up" message). In such instances, the wireless receiver circuit of the ULP wireless transceiver can decode the received wireless signal to decode the second information without decoding the first information encoded in the wireless signal. At 806, the second information is sent by, for example, the wireless receiver circuit of the ULP wireless transceiver to, for example, the processor of the wireless peripheral device.

II. Backchannel Communication Described with Reference to an Implementation for Beacon or Broadcast Communications, in Particular in a Star Network Topology Many deployed wireless networks and wireless standards in use today adopt what is called a "star" network topology, where there is one central access point (AP)/hub/router (the "star") that connects to multiple nodes. Nodes do not communicate directly with each other, and any node-to-node communication is done by routing through the access point device. In star networks, the AP and node devices are asymmetric, both in their physical design (size, power envelope, components), application (plugged in, wireless), and networking protocols (duty-cycling, broadcasting, relays). For example, a Wi-Fi AP is typically plugged in to a wall, continuously broadcasting its ID (network name), and always listening for new nodes requesting access to the network. In contrast, Wi-Fi nodes are often battery operated, do not broadcast their identity, and only communicate with the AP when needed (to send/receive data or maintain association with the network). Bluetooth Low-Energy (BLE) adopts a similar network topology, where one AP (e.g. a cell phone) broadcasts its identity and continuously monitors for BLE devices to connect to. Multiple BLE devices can connect to one AP. When not in range of the AP, the BLE peripheral devices go into a sleep state to save power. The IEEE 802.15.4 (and derivative) standard follows a similar topology, in this case AP generates beacons that node devices can use to synchronize to.

Figure 8:
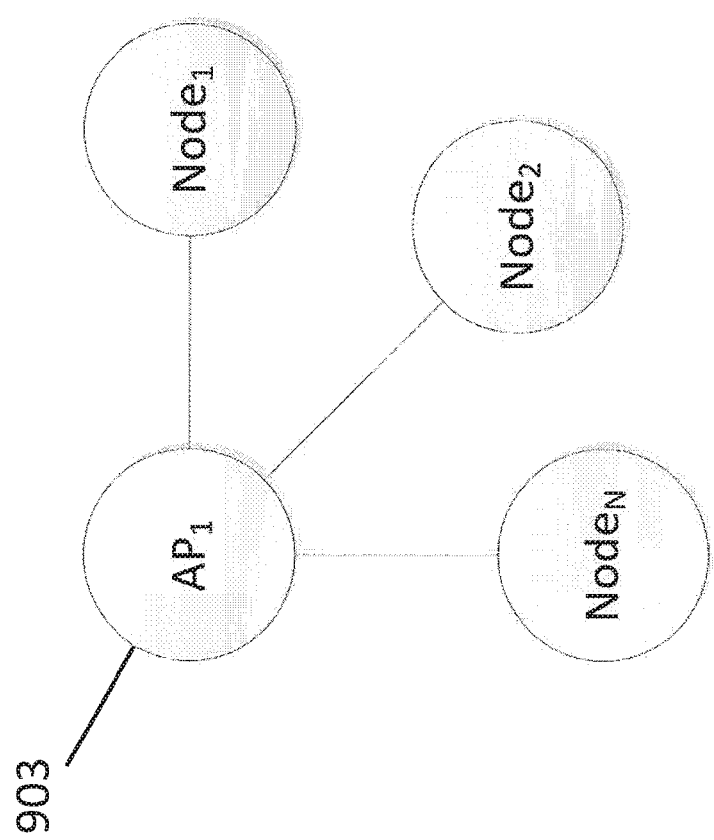
FIG. 8 is a diagram of a prior art wireless network.

FIG. 8 is a diagram of a prior art star network 900 including an AP 903 and three Nodes (1, 2, and 3). In these types of star networks, embodiments provide the ability to put the nodes into a sleep state with their standard-compliant and high-power radio disabled, yet still maintain the ability for the AP to wirelessly send data to the nodes (for example a wake up message). In the case of networks with an AP that continuously generates a broadcast or beacon, embodiments encode backchannel information is encoded onto the broadcast message. The backchannel information reaches all nodes within broadcast range, and provides a continuous stream of network messages for sending information to the lower power node devices over the established backchannel.

FIGS. 9-18 illustrate embodiments of an apparatus and method for broadcast, multicast and beacon wireless networks, including modulating beacon signals to create a backchannel via meaningful signals are transmitted to an ULP receiver. The ULP receiver may be capable of receiving only, and not capable of transmitting. Wireless systems that operate from a battery and/or from power harvested from the environment need only consume small amounts of energy to prolong the system lifetime for a given amount of available energy. The energy budget for a wireless system affects a widening set of applications due to a combination of requirements for smaller size (less battery volume, so less energy available), longer lifetimes (required to make energy last longer), and/or more functionality (requirement to do more with the same amount of energy). An emerging class of these wireless systems can be used in a variety of applications, including providing monitoring, sensing, control, and security functions. An increasing fraction of attention to these sorts of devices considers that they will need to operate at least in part using power harvested from their environment, and a new class of power harvesting systems on chip (SoCs) has emerged for this purpose. These SoCs may include combinations of power harvesting circuits, power management circuits, sensors or sensor interfaces, processing components (e.g. microcontrollers, microprocessors, digital signal processors, hardware accelerators), memory, and wireless communication circuits (e.g. radios).

Figure 9:
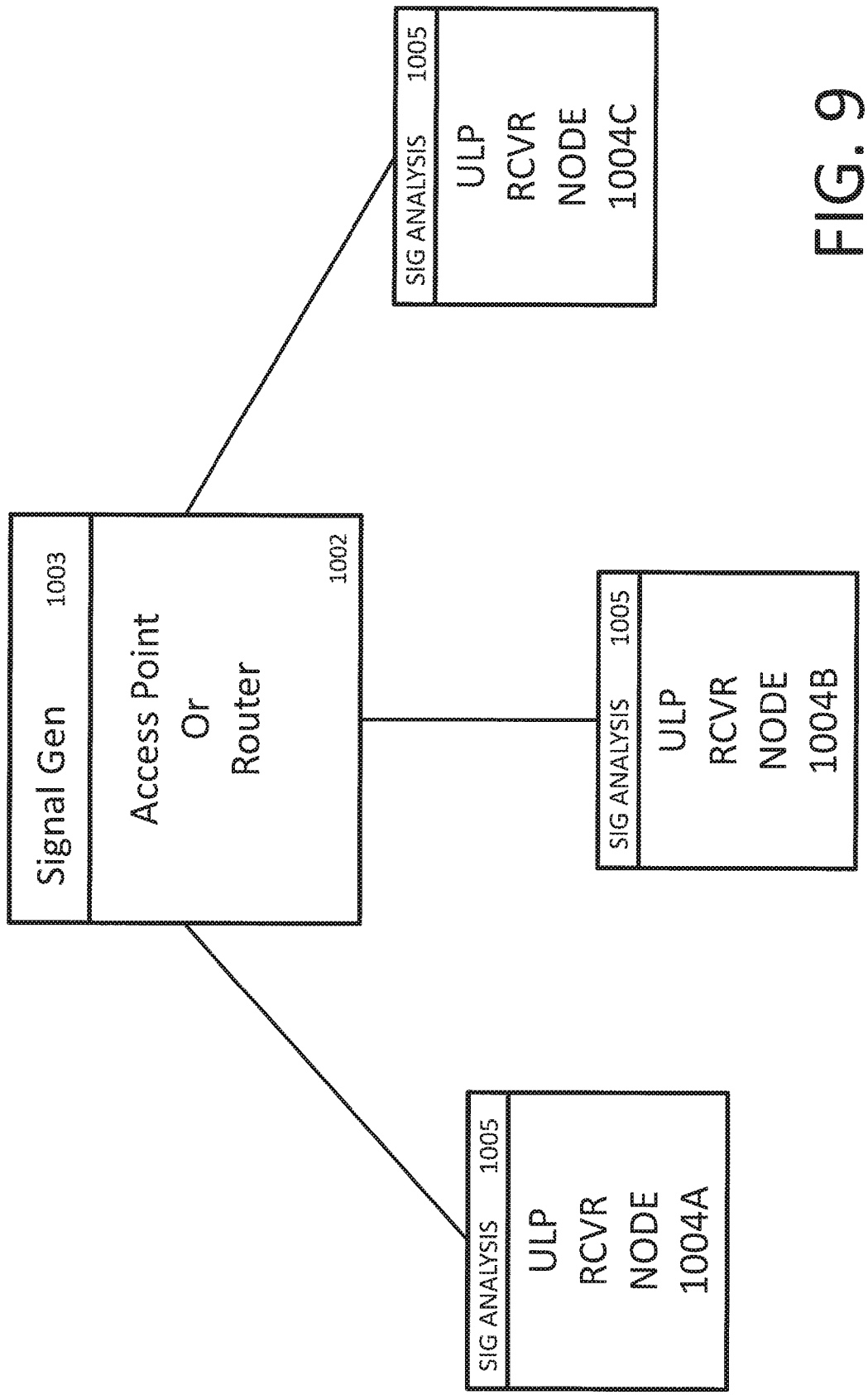
FIG. 9 is a diagram of a wireless network system according to an embodiment.

FIG. 9 is a diagram of a wireless network system 1000 according to an embodiment that includes an access point, or router 1002. The access point or router 1002 can be any device capable of wireless communication in the sense understood by those skilled in the art. Therefore, access point or router 1002 includes devices such as mobile phones, tablet computers, dedicated router devices in piconets, etc., that include the processing hardware, software, and/or firmware to execute the methods described and claimed herein. The network 900 also includes multiple ULP receiver nodes 1004A, 1004B, and 1004C. The number of access points and nodes is arbitrary. Receivers 1004 can receive signals from transmitters that are usually fully compliant (but are not required to be compliant). Receivers 1004 in an embodiment are receive-only devices, but that is not a requirement. Although most wireless communications rely on some kind of two-way communication (for example hand-shake acknowledgement that a packet was received), embodiments allow communication without acknowledgement on the part of the receiver. In an embodiment, the access point 1002 transmits a beacon, which does not typically expect a response. The signal generating module 1003 generates a beacon transmission that is regularly broadcast (for example as an advertising-type of signal). The ULP receivers/nodes 1004 receive the beacon or broadcast transmission in the normal way. However, the signal generating module 1003, in an embodiment, modulates the "normal" beacon signal in a way that is within the constraints of the beacon or broadcast protocol used to transmit data in the normal star network manner. A signal analysis module 1005 on each of the ULP receivers 1004 is capable of demodulating the backchannel element of the normal broadcast transmission, and therefore communicates without requiring a fully compliant (meaning compliant with the broadcast or beacon protocol being used in the star network) radio. Examples of embodiments in which the methods and systems can be used include Zigbee networks, BLE networks, WiFi networks, cellular networks, and other "nonconnectable advertising" networks.

Figure 10:
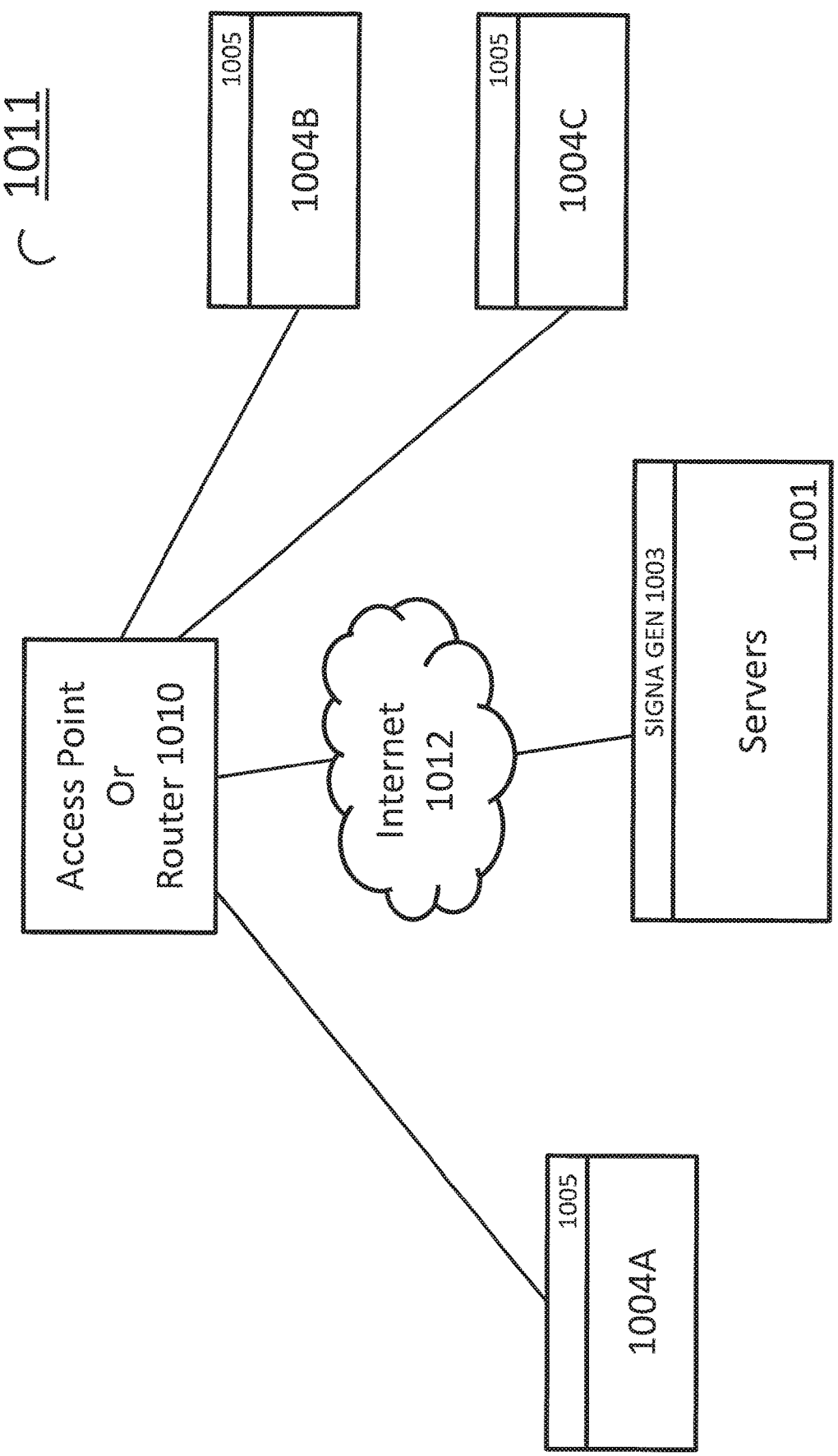
FIG. 10 is a diagram of a wireless network system according to an embodiment.

FIG. 10 is a block diagram of an alternative system 1011 for backchannel communication in a beacon or broadcast network. In system 1011, an access point or router 1010 is in a star-type network with multiple receivers/nodes 1004. Access point or router 1010 does not have a signal generator such as signal generator 1003 resident on its processors, nor does the access point or router itself execute a signal generator 1003. Rather, signal generator 1003 executes remotely on servers that are accessible to the access point or router 1010 via the Internet or any other network. In this embodiment, a star network can be set up and function without instantiation of any signal generation software/hardware/firmware on the access point/router, but yet, the network can benefit from backchannel communications as described herein to enable the use of low power receivers (nodes) that might not be fully compliant with the communication standard being employed in the network. This is an example of a situation in which (as an example) a homeowner may have multiple systems in the home controlled by a router in a star network. The router receives wireless signals to control the systems in the home. These signals may be hosted by or facilitated by a third party entity that provides a service of (for example) remotely controlling home systems. In such a situation, the signal generation software 1003 can be in the path of this relationship between homeowner and third-party administrative entity. To reiterate, in this embodiment, the access point/router itself (like the nodes) does not necessarily need to run specific software or have specific hardware in order to be an element of the methods and systems described and claimed herein.

Figure 11:
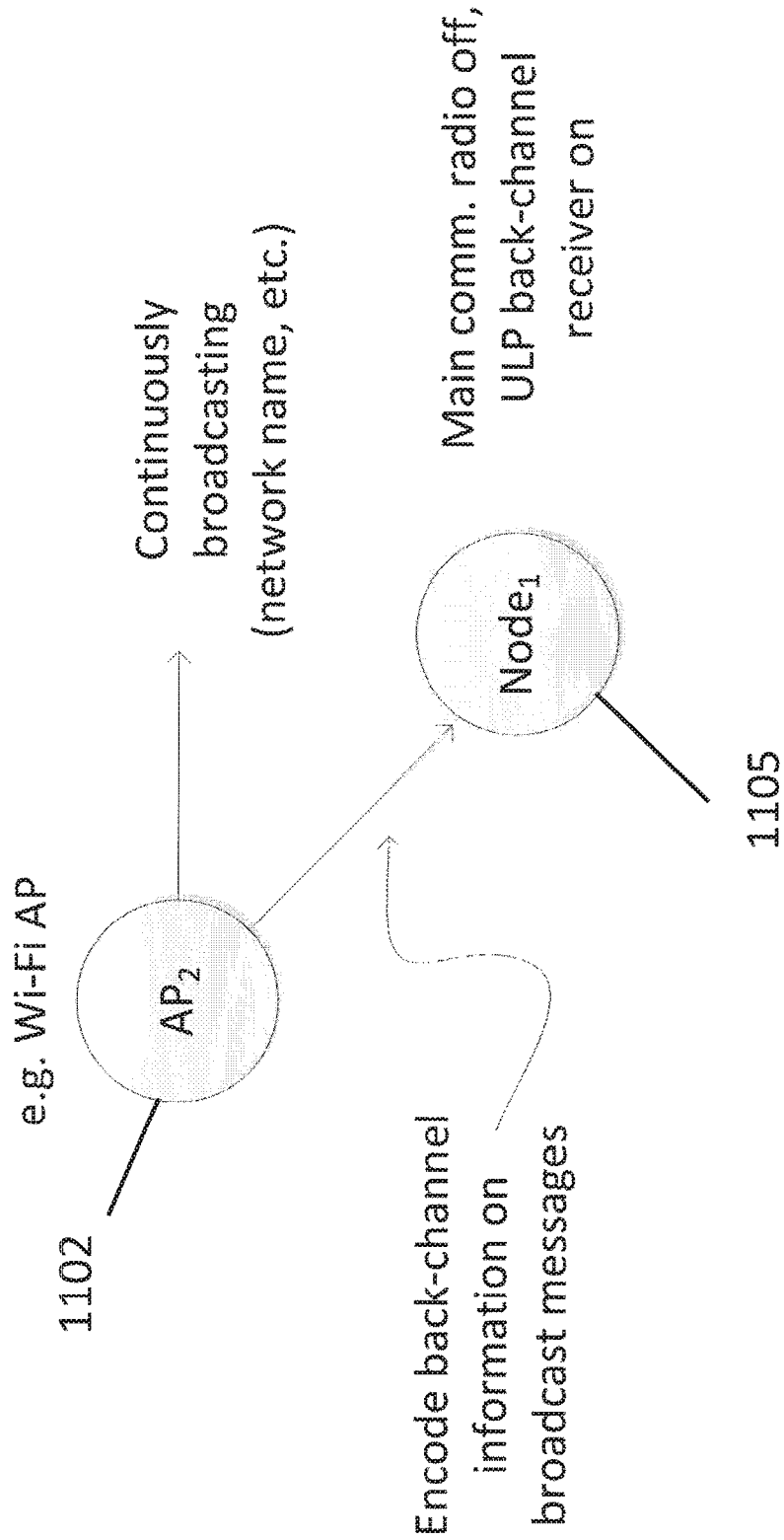
FIG. 11 is a diagram illustrating methods of encoding backchannel information on a beacon signal.

With reference, to FIG. 11, embodiments of a backchannel communication method and system for a beacon/broadcast network include at least three methods of modulating back-channel information onto the access point (AP) beacon signal: modulating the length of time the AP transmits a repetitive beacon signal, modulating the beacon interval (time between beacon packets), and modulating the length of the beacon packet itself (by modulating how much data is in each beacon packet). AP 1102 (signal generation module 1003 is not shown, but is present as shown in either of FIG. 9 or 10) is continuously broadcasting information such as its network name, and other identifying information. Node 1105 (which in an embodiment includes a signal analysis module 1005, not shown) receives the broadcast signal from the AP 1102. Typically, the main communication radio of node 1105 (which is also usually a communication standard compliant radio) is in a low power mode that implies that its communication radio is turned off. However, regardless of whether the main communication radio is turned on for a particular node, the node can still be capable of receiving backchannel communications as encoded on the broadcast. This can be referred to as the node having its main radio off and it ultra-low power (ULP) back-channel receiver on.

Figure 12:
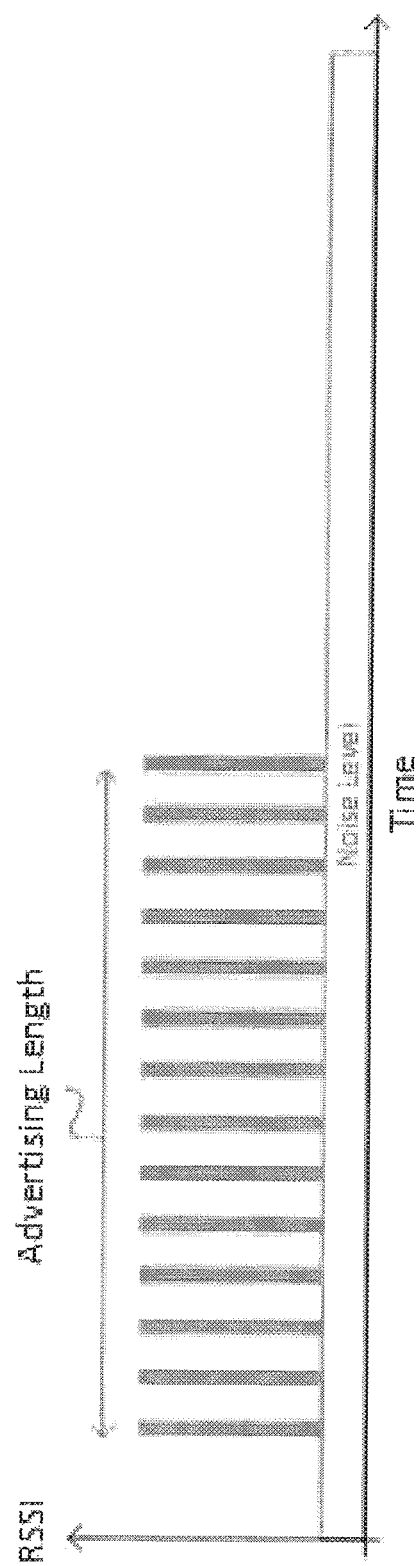
FIG. 12 is a signal diagram illustrating a method of encoding backchannel information on a beacon or broadcast signal according to an embodiment.

FIG. 12 is a diagram illustrating one method of modulating backchannel information on standard wireless communications. Using Bluetooth (BT) as an example communication standard, there are various commonly supported modes of operation of the BT radio that are programmable through an application running on an operating system on the device that hosts the BT radio.

FIG. 12 illustrates a method of performing backchannel communication based on a length of time of an AP transmission, or advertising length. When the BT radio is placed in a nonconnectable advertising mode, the amount of data carried in the BT packet can be specified by the transmitting device, which determines the time duration of the wireless BT packet (packet length). More data results in a longer-duration BT packet, and less data results in a shorter-duration packet. The advertising packet interval is typically specified as one of several pre-defined interval ranges, for example, short, medium, and long intervals. By start and stop advertising from the program or app, the advertising length can be controlled. All of these mechanisms can be combined as described below to encode information onto a back-channel in the BLE beacons.

Binary information in wireless systems is encoded onto a set of signals, called symbols. To encode N bits of data, $2^N$ unique symbols are possible, only one of which is sent at a time depending on what the current N-bits of information are. For back-channel modulation specifically on beacons, and in the context of back-channel communication using BT radios in a cell phone, different symbols can be generated by specifying different: lengths of beaconing events, packet lengths, or packet intervals.

Figure 13:
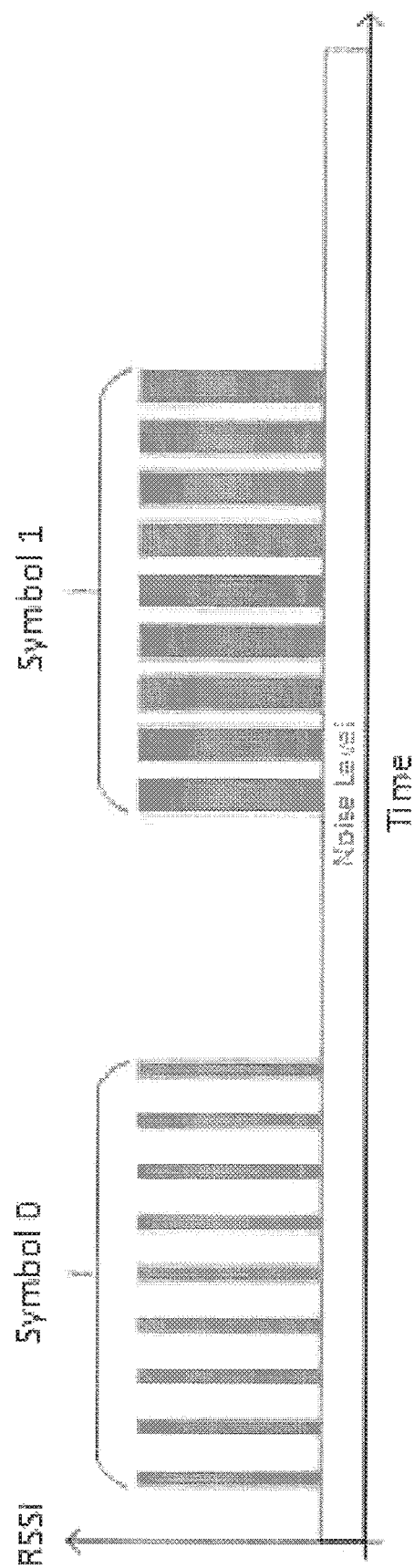
FIG. 13 is a signal diagram illustrating a method of encoding backchannel information on a beacon or broadcast signal according to an embodiment.

FIG. 13 is a signal diagram 1300 illustrating the use of two different packets lengths to differentiate between symbol "0" and symbol "1".

Symbol 0 has a beaconing P-length 0. Symbol 1 has a beaconing P-length 1, which is different than p length 0.

Figure 14:
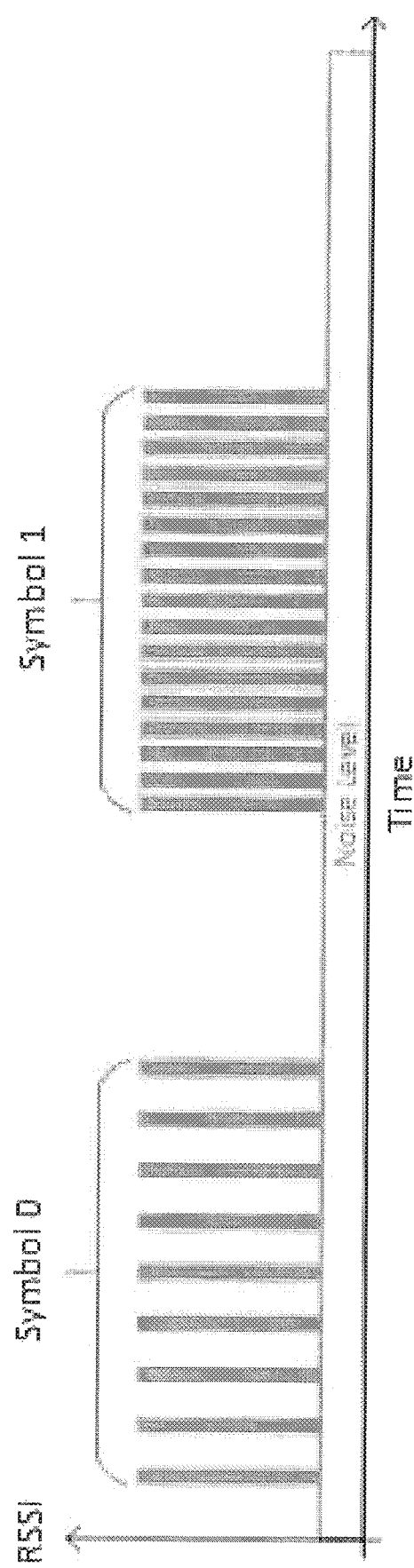
FIG. 14 is a signal diagram illustrating a method of encoding backchannel information on a beacon or broadcast signal according to an embodiment.

FIG. 14 is a signal diagram 1400 illustrating the use of two different packet intervals (interval 0 and interval 1, respectively) to differentiate between symbol "0" and symbol "1".

Figure 15:
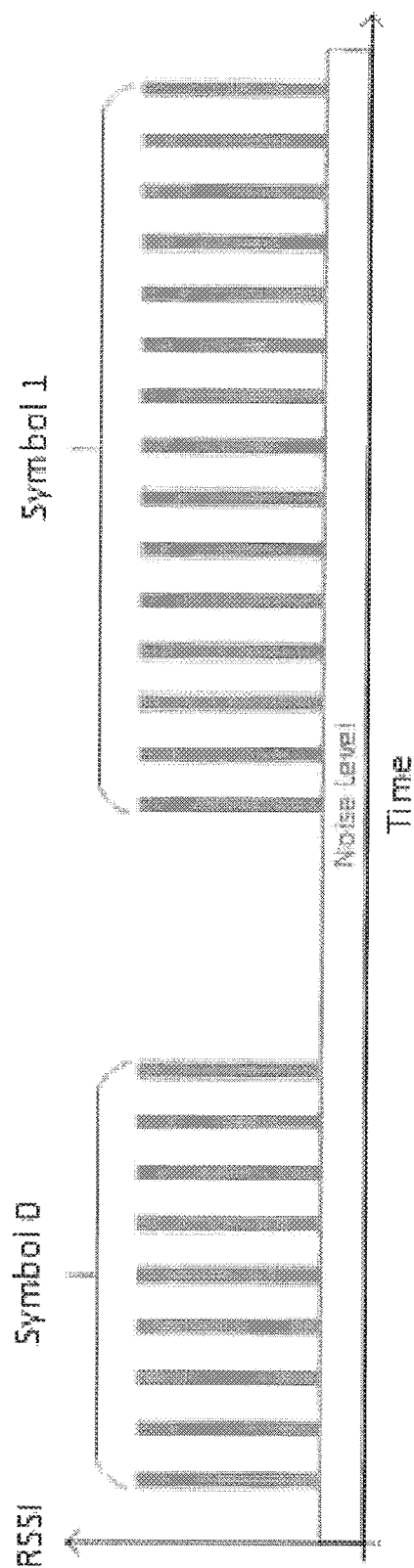
FIG. 15 is a signal diagram illustrating a method of encoding backchannel information on a beacon or broadcast signal according to an embodiment.

FIG. 15 is a signal diagram 1500 illustrating the use of two different advertising lengths (A-length 0 and A-length 1, respectively) to differentiate between symbol "0" and symbol "1".

In an embodiment back-channel information is encoded in the rate at which wireless advertising packets are broadcast by the AP transmitter. The information is decoded as illustrated in FIG. 16.

Figure 16:
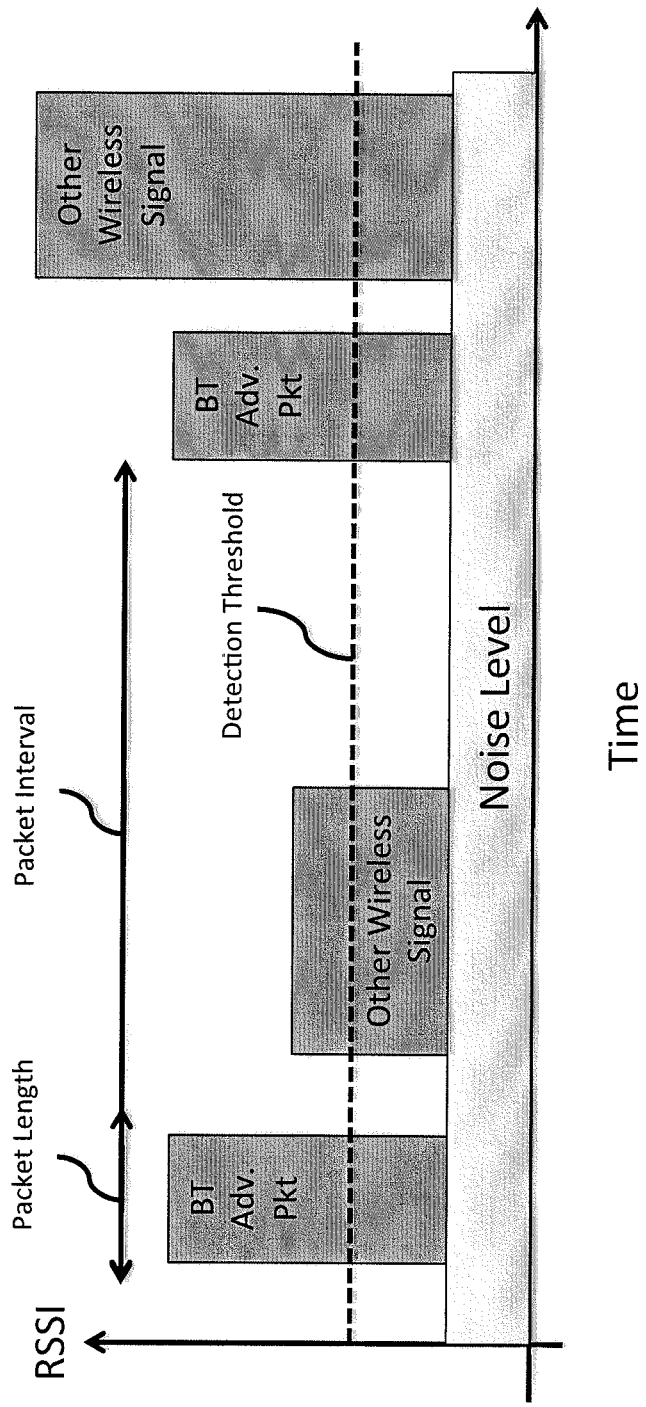
FIG. 16 is a signal diagram illustrating a method of encoding backchannel information on a beacon or broadcast signal according to an embodiment.

FIG. 16 is a signal diagram 1600 showing the detection of wireless packets as signals with power above the noise level, in the presence of other wireless signals with power above the noise level shown on the received signal strength indication (RSSI) axis). The wireless advertising packet length and the wireless advertising packet interval are also indicated. An assumption is that the RF energy is being measured by an ULP receiver, and compared to a baseline energy level. When a wireless advertising packet is being received, the energy level will exceed the baseline level, and in an embodiment that is detected through a comparator. When the packet is present, the comparator output is a 1. When no packet is being received, the energy level falls below the baseline causing the comparator output to equal 0.

FIGS. 17A-17E are signal diagrams illustrating a method of combining packet length and advertising duration for 2-bits per symbol. Four symbols are generated. Only one symbol is generated at a time, at a fixed symbol rate. The symbol is selected depending on the two information bits to be transmitted.

Figure 17A:
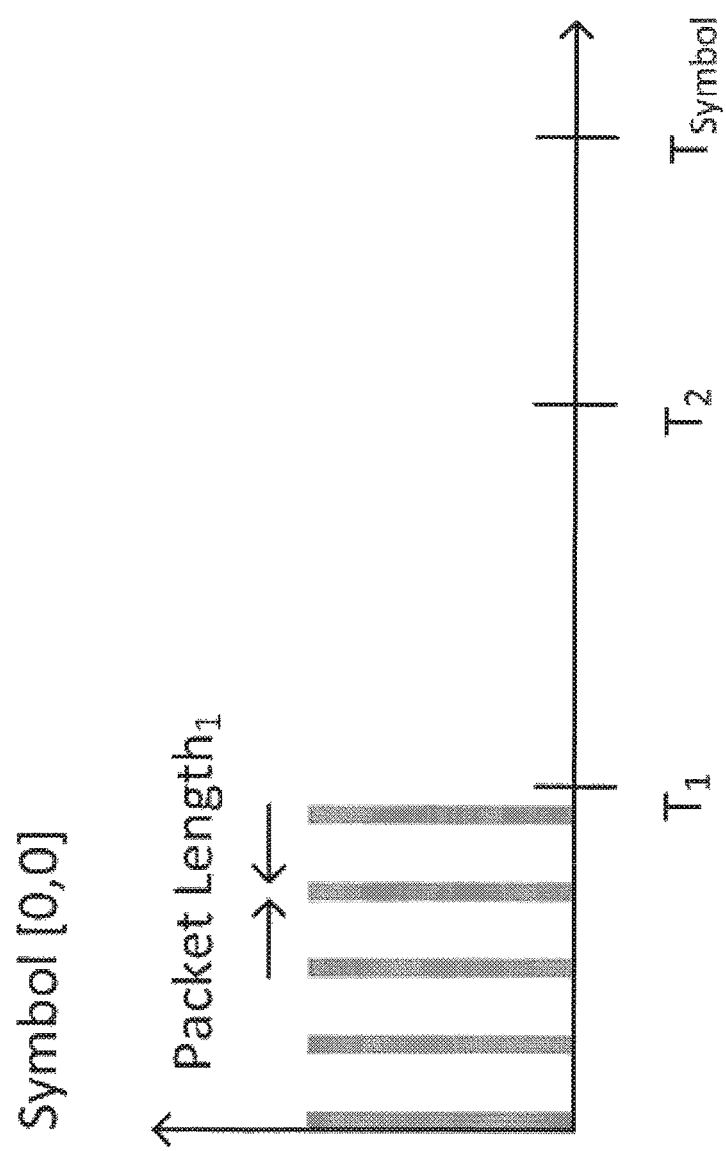
FIGS. 17A-17E are signal diagrams illustrating a method of encoding backchannel information on a beacon or broadcast signal according to an embodiment.

FIG. 17A is a signal diagram illustrating the generation of symbol [0,0] which is defined as short packet length and short advertising duration. In an embodiment, a short advertising duration is T1.

Figure 17B:
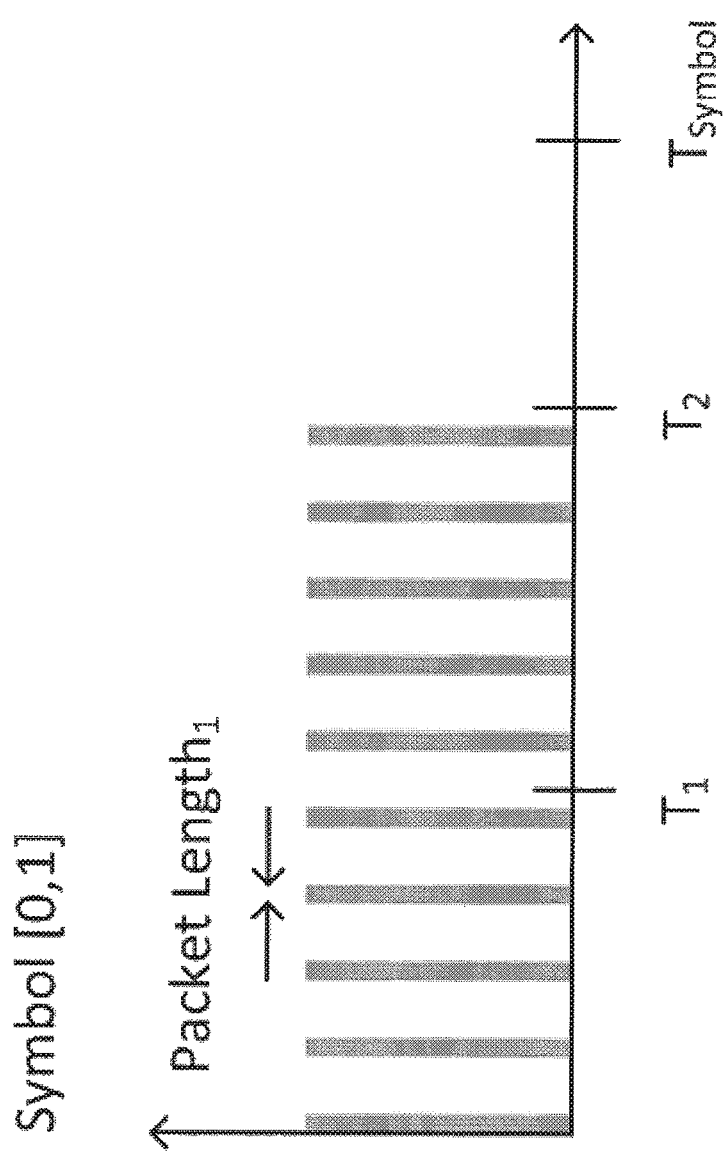

FIG. 17B is a signal diagram illustrating the generation of symbol [0,1] which is defined as short packet length and long advertising duration. In an embodiment, a long advertising duration is T2.

Figure 17C:
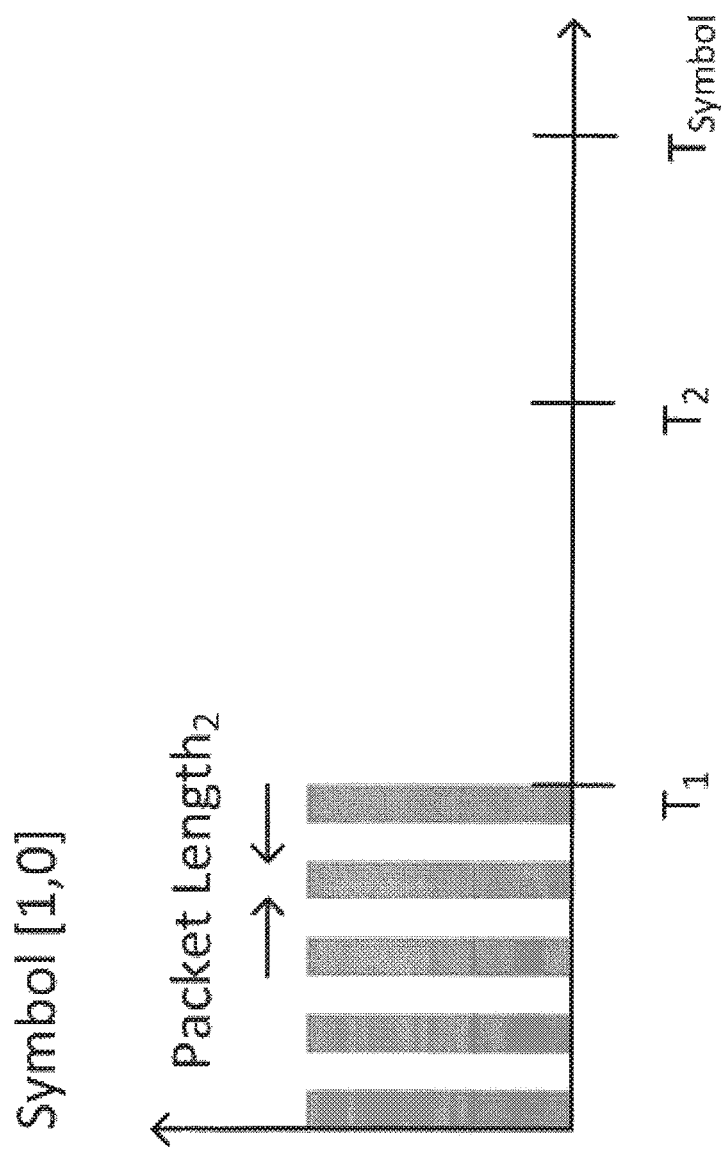

FIG. 17C is a signal diagram illustrating the generation of symbol [1,0] which is defined as long packet length and short advertising duration.

Figure 17D:
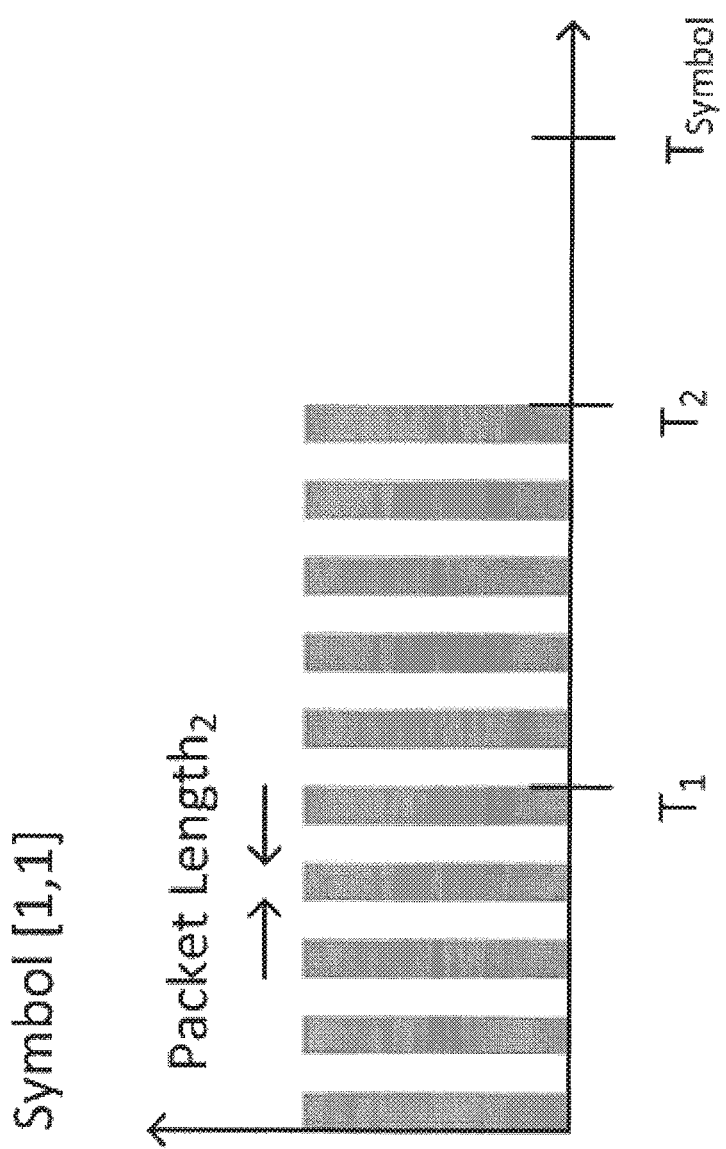

FIG. 17D is a signal diagram illustrating the generation of symbol [1,1] which is defined as long packet length and long advertising duration.

Figure 17E:
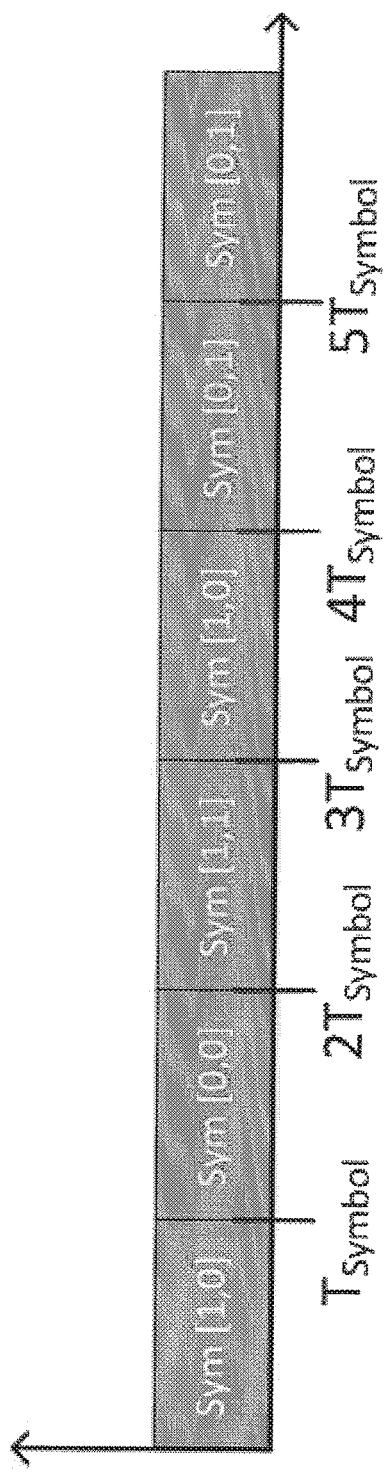

FIG. 17E illustrates an example backchannel message generated using a method according to an embodiment.

In an embodiment, the wireless advertising packet identified is performed by hardware and/or software that operates on the AP, or on behalf of the AP as follows. The advertising packet length is measured by looking at length of time the RSSI signal is high.

Filtering is performed for a pre-defined packet length in the wireless standard being used (e.g., 100 us-300 us for Bluetooth), and specified by the back-channel modulation method as described herein. Packets that are longer or shorter than the specified length are rejected.

The time between packets (packet interval) is measured by the length of time the RSSI signal not "high". In an embodiment this is done by first filtering for packets separated by a pre-defined packet interval within the wireless standard when a wireless standard compliant radio is in the advertising mode. The packet interval is defined by the back-channel modulation method. Packets that arrive before or after that specified packet interval time are rejected. Finally a repetitive sequence of identical wireless packets matching the specified packet length and interval are identified using correlation.

Once the advertising packet has been identified, the advertising length (duration of time the advertising packets are received) is measured. The start of the advertising length is identified as the time the first advertising packet was received.

The end of the advertising length is identified as the time the last advertising packet was received. That is, when the packet length and packet interval no longer match the pre-defined values, or when no more packets are received.

The advertising length is measured by the time duration between start and stop, or counting received advertising packets with a known packet interval.

The advertising length is quantized into a pre-defined set of ranges, specified for back-channel modulation. One combination of packet length, packet interval, and advertising length corresponds to one received back-channel symbol (or a "chip"). For example, the advertising length falling in the range of 800 ms to 1200 ms corresponds to Symbol 0, and in the range of 1800 ms to 2200 ms corresponds to Symbol 1, assuming the same packet length and packet intervals. This can be expanded to M (M=L·N·A) symbols where L is the number of different packet lengths, N the number of different packet intervals, and A the number of different advertising lengths specified for back-channel modulation.

Once the backchannel message is received by a node, it is decoded as follows. The sequence of received symbols is correlated with an expected sequence to detect when back-channel communication is being initiated. Once back-channel communication has been initiated, additional symbols may be received as a payload of data carried in the back-channel message. This payload is arbitrarily defined, and can be split into different sections such as a header, data frame, and footer. This payload could include information such as routing information, source and destination addresses, modulation format information, data, error detection and correction information.

Multiple access mechanisms such as CDMA could be added layered on top of this modulation format.

Figure 18:
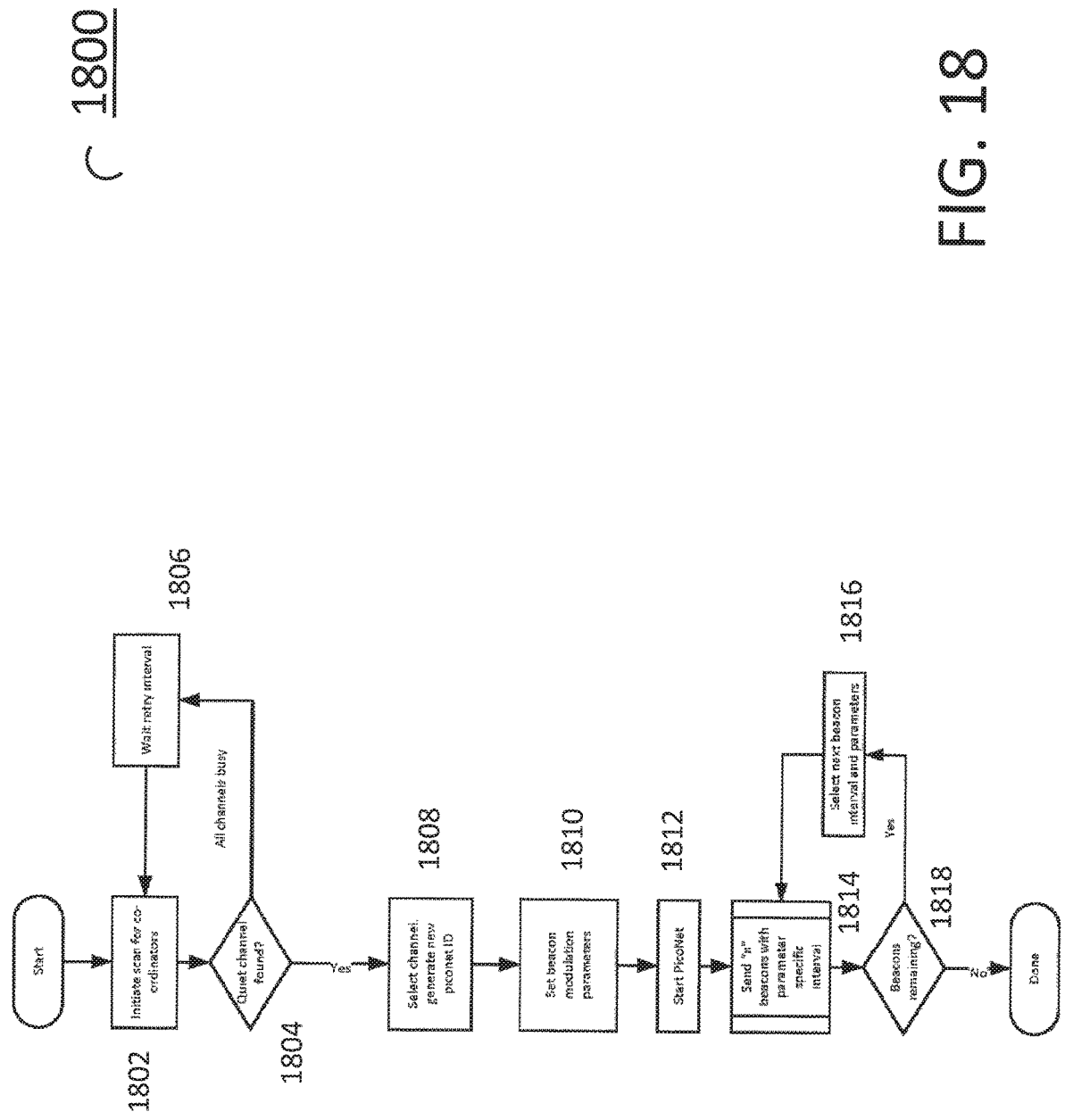
FIG. 18 is a flow diagram illustrating a method of communicating with a device in a wireless network using backchannel communication according to an embodiment.

FIG. 18 is a flow diagram of a method 1700 for modulating wireless network beacons according to an embodiment. As an example, the 802.15.4 standard is used as an example wireless standard, but embodiments are not so limited. In the example described, it is not necessary to have special software or hardware present on a network coordinator. For example, in a home piconet the last link servers execute the described method. In method 1800, a low power node that is in a sleep state is woken up by essentially creating a new piconet specifically for the purpose of communicating a wakeup message to the sleeping node. The transmitting radio assumes the role of coordinator, even if there is already an established coordinator within an existing piconet. Establishing its own piconet independent of an existing piconet assures that beacon modulation does not interfere with the existing piconet.

At 1802, the network is scanned for coordinators. Coordinators can also be referred to as base stations, routers, or hubs. At 1804, a search for a quiet channel within the network is performed. If there is no current quiet channel, a retry is performed after a predetermined interval (1806). If a quiet channel is found, the channel is selected, and a new piconet ID is generated at 1808. The beacon modulation parameters are set (1810) as previously described. Specific beacon parameters are set to produce the proper beacon length, beacon rate, and beacon repetition for the secondary communication.

The piconet is started at 1812, and "n" number of beacons are sent over the "new" piconet with the specific modulated parameters (1814). If all "n" beacons have been sent, as determined at 1818, the process is finished. The nodes within the quiet channel have now received beacons that include the modulated backchannel information. If there are addition beacons to be sent, the next beacon interval and parameters are selected (1816), and the additional beacon is sent. This continues until the entire back-channel message is complete.

III. Backchannel Communication within a Wireless Network Using a Proxy Device

Wireless networks include wireless access points (AP) or routers that broadcast the WIFi network ID, and manage all of the wireless communication traffic, as well as devices that associate with the network. The wireless network AP or router serves as the gateway for devices to other networks, including wide area networks such as the Internet or "cloud".

Once a device discovers a wireless network and associates with it, the AP assigns the device a unique IP address on that wireless network. Once this happens, the device is then connected to the cloud through the AP. Thus, the device is discoverable (by means of its IP address) through higher level protocols by any other device communicating to the cloud, whether or not the other device is in the same local wireless network. According to an embodiment, as further described below, a web server can poll a device that is local to a wireless network through the network AP to request information from a device (e.g. a sensor device) with a wireless radio. As long as the device maintains regular communication with the AP according to the wireless standard protocol being used, the device will remain associated with the AP and connected to the cloud. As soon as the device stops communicating, the AP will disassociate it from the network, releasing any resources it was using. This requires a new association process if the device were to connect again, as if there is no difference between a device associating for the first time or the 100$^{th}$ time. When the device disconnects from the wireless network AP, it is also disconnected from the cloud and there is no way for a cloud resource, such as a web server, to initiate communication with it.

According to various embodiments further described below, one or more ULP devices are placed in a "local" wireless network but are not explicitly associated with the wireless network AP. Associating with the AP has a high power cost that it is desirable to avoid for certain devices. In embodiments the ULP device is similar to the devices described with reference to FIGS. 1B, 2, and 5. According to embodiments, cloud-based services can send messages to a receiving device within the wireless network and associated with the wireless network. However, the messages are actually intended to be received by a ULP device that is not associated with the AP. The receiving device is referred to herein as a proxy device. Typically the proxy device does not have significant power limitations and can be associated with the AP at all times. The proxy device receives the message, which typically has no meaning for the proxy device, so it is discarded. However, as a consequence of introducing the message with its backchannel content into the wireless network, ULP devices for which the backchannel message is intended can receive this message (e.g. as wakeup message) and act on it.

Figure 19:
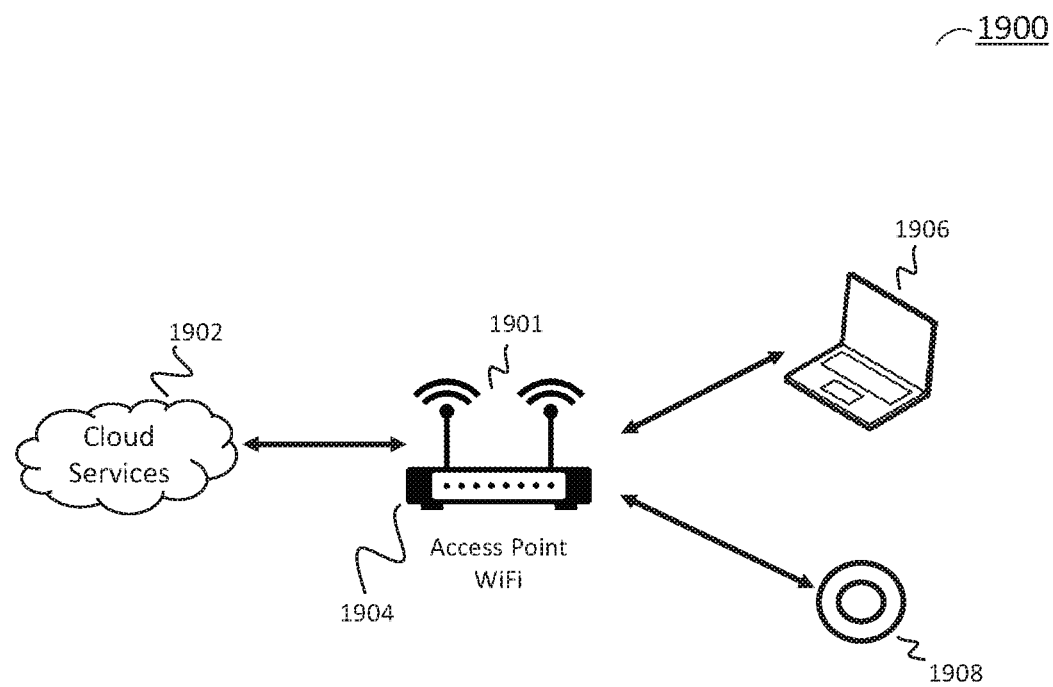
FIG. 19 is a diagram of a wireless network according to an embodiment.

FIG. 19 is a diagram of a wireless network 1900 according to an embodiment. Network 1900 includes a wireless AP 1901 in communication with cloud services 1902. Although not shown in the figures, it is intended that cloud services 1902 require one or more servers (sometimes referred to as cloud servers) executing software to perform the described communications. Devices 1906 associated with the network 1900 include the laptop shown and other power devices (not shown). Devices 1906 can include devices that are typically plugged into a power supply, such as a wireless printer, wireless thermostat, wireless doorbell, and wireless security camera. Devices 1908 are low power or ultra-low power network devices that may or may not be consistently associated with the AP 1901. Devices 1908 may only turn on and associate with the AP when then have information to communicate, such as the Amazon Button or a wireless bathroom scale. According to embodiments, wireless devices 1908 can be polled from a cloud service 1902, without requiring the low-power devices themselves maintain an association with AP 1901. Examples of cloud services 1902 include any web site or cloud-based source, including without limitation: Amazon web services; Fitbit.com; Google Maps (e.g. a user may bring up Google maps in order to find out the temperature within a remote building), Nest.com; etc.

Proxy Node Network, Wakeup Initiated by the could Services

Figure 20:
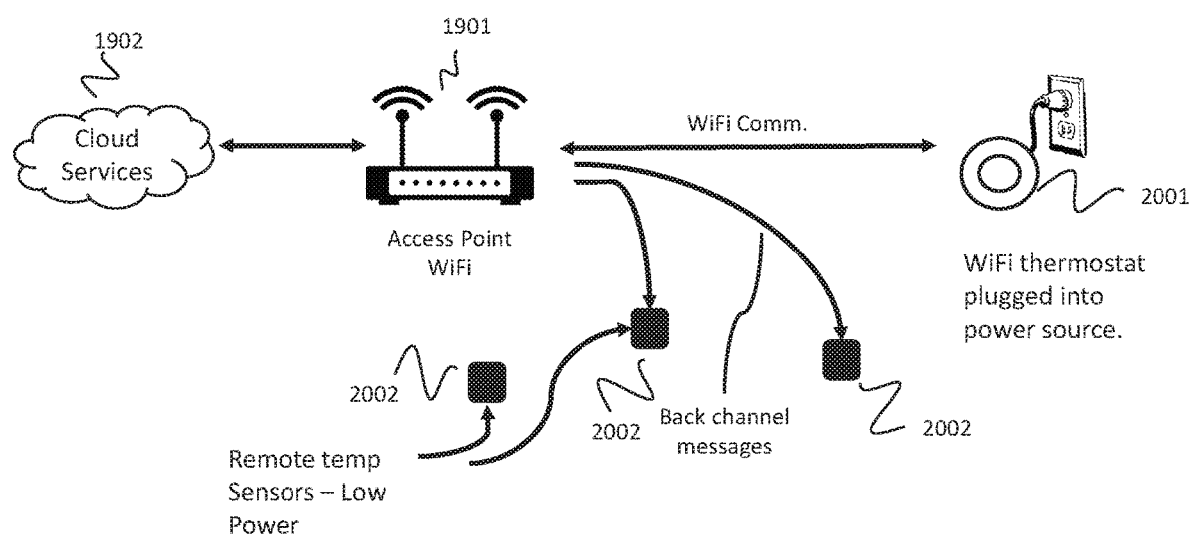
FIG. 20 is a diagram of a wireless network according to an embodiment.

With reference to FIG. 20, a wireless network 2000 includes an AP 1901 in communication with cloud services 1902 and an example of a powered network device: wireless thermostat 2001. Also within wireless communication range are various low-power or ultra-low power, non-compliant "backchannel" devices 2002, such as remote temperature sensors (as one example). According to an embodiment, in order to cause AP 1901 to produce a backchannel message that can be received by a non-compliant device 1908, a proxy device is associated with the wireless network and plugged into a power source so that it remains on at all times. The proxy device maintains a connection with the AP, and has unique IP address that can be addressed by the cloud services. Conversely, the proxy devices can initiate messages to the AP 1901 that will be detected by network devices within range, including the backchannel devices 2002. Wireless thermostat 2001 is an example of a proxy device.

Backchannel devices 2002 are within range of the AP, but do not normally have their wireless radios on. Therefore, they are not associated with the wireless network 2000 according to the relevant wireless standard. However, backchannel devices 2002 include backchannel receivers as previously described, and listen for a wakeup signals from AP 1901. Cloud services 1902 are aware of devices 2002 within range of the AP 1901 where the proxy device 2001 is connected. In this environment, when a cloud service wishes to initiate communication with devices 2002 via backchannel communication, it can do so by sending a wireless message to any IP address via the AP 1901. The recipient IP address is not important because the protocol compliant message is essentially meaningless. The goal is for cloud servers to modulate backchannel information on the protocol compliant message so that the backchannel devices 2002, which are designed to demodulate the backchannel information, will receive and act on the backchannel information.

This message, while compliant with the wireless protocol in use, also carries the appropriate data to produce a backchannel message that can be recovered by the receivers of the low-power backchannel devices. This backchannel message could instruct a specific device to wake up and take a sensor reading, or to wake up its wireless radio (if it has one) and associate with the AP 1901 to check in with cloud services 1902.

Proxy Node Network, Wakeup Initiated by Proxy Device

In many cases, a wireless device associated with the AP may wish to communicate with a low-power device using backchannel messages produced by its wireless standard-compliant radio. However, it is difficult to get a commercial, off-the-shelf wireless module to produce arbitrary messages. Typically, these modules are designed to comply with the wireless standard, and offer limited capabilities beyond that.

Figure 21:
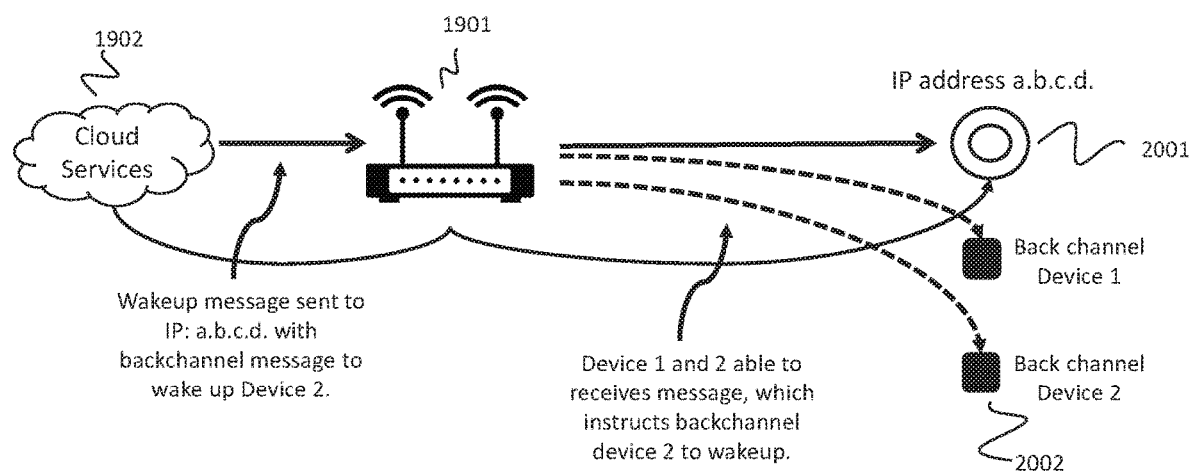
FIG. 21 is a diagram of a wireless network according to an embodiment.

With reference to FIG. 21, in an embodiment backchannel communication is initiated in a wireless network 2100 in the following way. The connected wireless device 2001 associates with an AP 1901 normally, and establishes a connection with a cloud service 1902. When the wireless device 2001 wishes to send a backchannel message to another device 2002 (a non-compliant, low-power device) in range of its wireless radio, it instead instructs its wireless module to send that message to the cloud service 1902 (which can simply discard the message). Sending the message to the cloud service 1902 initiates the connected device 2001 to transmit the message to the AP 1901, and that message can be heard by all nearby devices. By encoding that message in a way that produced a backchannel message (as previously described, the local backchannel receivers (of devices 2001) can recover the message.

Peer-to-Peer Initiated Backchannel Messages

Figure 22:
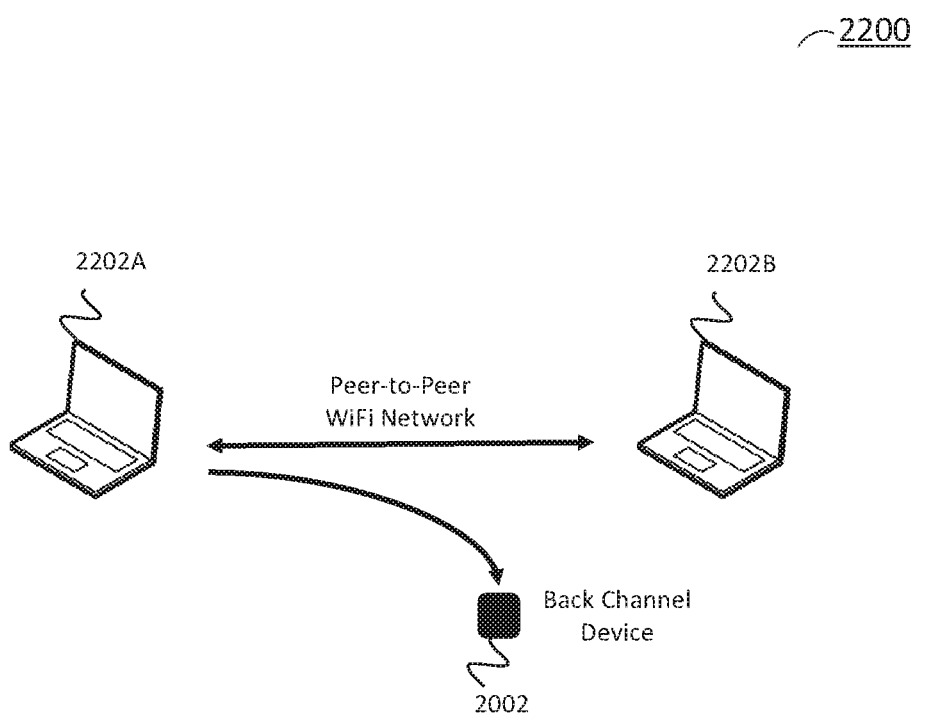
FIG. 22 is a diagram of a wireless network according to an embodiment.

With reference to FIG. 22, the wireless standard also supports peer-to-peer networks that do not require an AP. Another embodiment includes initiating a peer-to-peer network between two wireless compliant devices, such as laptops 2201A and 2202B. Once that network connection is established, backchannel communication can be accomplished by sending a message from one device 2202 to the other, where the message is encoded with backchannel information. Any backchannel receiver within range (such as the receiver of device 2002) will be able to receive that message and recover the contents.

Embodiments of Proxy Nodes

Proxy nodes are devices capable of wireless communication in compliance with any of the current wireless communication standards. Examples of wireless communication standard protocols include (without limitation) WiFi, Zigbee, IEEE 802.15.4, 6LowPAN, any cellular standard, including LTE, and GSM, Bluetooth, and a nonconnectable advertising network. Proxy nodes are typically connected devices on the local wireless network that serve as an endpoint or a startpoint for communication packets that are intended for backchannel receivers. For this reason, these devices are not required to have any specific functionality (for backchannel communication purposes), other than they are associated with the AP of the wireless network. These proxy devices can include devices similar to wireless printers, thermostats, speakers, and security cameras. Proxy devices could also have very limited functionality beyond routing traffic to backchannel devices. One embodiment of a proxy device is a device connected to and possibly (but not necessarily) powered over an Ethernet connection. In an embodiment, the proxy device connects to an Ethernet port on the back of a WiFi router, from which it also draws its power. It contains a standard compliant radio that associates with the AP in the same way that any external device would. In associating with the AP, the proxy device establishes a connection to cloud services and provides the required endpoint for routing backchannel traffic to its local wireless network. It is intended that some of the methods and apparatus described herein can be performed by software (stored in memory and executed on hardware), hardware, or a combination thereof. For example, the control software on the cell phone can be performed by such software and/or hardware. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

For example, while many of the embodiments described herein are discussed in the context of a cell phone, other types of mobile communication devices having a commercial radio can be used such as, for example, a smart phone and a tablet with wireless communication capabilities. Similarly, while many of the embodiments described herein are discussed in the context of sending and receiving data packets, any type of data unit may be applicable including data cells and data frames, depending upon the applicable communication standard.

What is claimed is:

1. A method for wireless communication, the method comprising:

a cloud service using a cloud server to send a wireless message to a wireless access point in a wireless network according to a standard wireless communication protocol, wherein the wireless message is addressed to an address of a proxy device within the wireless network, and wherein the message includes standard wireless communication protocol ("standard protocol") compliant data and backchannel data in a same communication channel, and the standard wireless communication protocol is selected from groups of wireless standards including a first group consisting of the Institute of Electrical and Electronics Engineers (IEEE) standards and by consortiums including Bluetooth and a second group of wireless standards, the wireless standards including mandatory modes that must be supported by the wireless access point to be considered compliant with the wireless standards, and wherein the proxy device comprises a device that is coupled to an external power source and thus is not considered to be a low power device;

the proxy device receiving the wireless message, wherein the proxy device is configured to process the wireless message and the proxy device is not compliant with the standard wireless communication protocol ("not protocol compliant") such that the proxy device is not capable of processing the wireless message according to the standard wireless communication protocol; and one or more low power devices within the wireless network that are not protocol compliant receiving the wireless message from the proxy device and demodulating the backchannel data, wherein the one or more low power devices are not coupled to an external power source.

2. The method of claim 1, wherein the backchannel data comprises a wakeup message for the one or more low power devices.

3. The method of claim 1, wherein the one or more low power devices comprise sensor devices that each include a radio that is compliant with the standard wireless communication protocol, and that is not active unless interrogated.

4. The method of claim 1, further comprising the cloud server encoding the backchannel data on the wireless message, comprising modulating a packet length of each packet within the wireless message.

5. The method of claim 1, further comprising the cloud server encoding the backchannel data on the wireless message, comprising modulating a length of a payload of each packet within the wireless message.

6. The method of claim 1, further comprising the cloud server encoding the backchannel data on the wireless message, comprising modulating a time response of the wireless message.

7. The method of claim 1, further comprising the cloud server encoding the backchannel data on the wireless message, comprising modulating a frequency response of the wireless message.

8. The method of claim 1, further comprising the cloud server encoding the backchannel data on the wireless message, comprising modulating a time sent for each packet of the wireless message.

9. The method of claim 1, further comprising the cloud server encoding the backchannel data on the wireless message, comprising modulating a time interval between adjacent packet of the wireless message.

10. The method of claim 1, further comprising the cloud server encoding the backchannel data on the wireless message, comprising modulating a packet rate of the wireless message.

11. The method of claim 1, further comprising the cloud server encoding the backchannel data on the wireless message, comprising modulating a packet channel frequency of the wireless message.

12. The method of claim 1, wherein the second group of wireless standards comprises:
WiFi;
Zigbee;
IEEE 802.15.4;
6LowPAN;
LTE;
GSM; and
a nonconnectable device advertising network standard.

13. The method of claim 1, wherein the one or more low power devices comprise sensor devices that each include a protocol compliant device that is compliant with the standard wireless communication protocol, and that is not active unless interrogated, and wherein the backchannel data comprises a wakeup message for the one or more backchannel devices that are not compliant with the standard wireless communication protocol.

14. A method for wireless communication, the method comprising:
a wireless protocol compliant device in a wireless network receiving a protocol compliant wireless message, and modulating backchannel data onto a protocol compliant wireless message, wherein the protocol compliant wireless message is formed according to a standard wireless communication protocol ("standard protocol"), wherein the standard wireless communication protocol is selected from groups of wireless standards including the Institute of Electrical and Electronics Engineers (IEEE) standards and by consortiums including Bluetooth, the wireless standards including mandatory modes that must be supported by the wireless protocol compliant device to be considered compliant with the wireless standards;
the wireless protocol compliant device transmitting the wireless message to one or more addressable noncompliant devices, wherein the one or more addressable noncompliant devices is not capable of processing wireless data according to the standard wireless communication protocol; and
the one or more addressable noncompliant devices within the wireless network receiving the wireless message and demodulating the backchannel data.

15. The method of claim 14, wherein the wireless protocol compliant device in a wireless network modulating the backchannel data comprises one or more of:
modulating a packet length of each packet within the protocol compliant wireless message;
modulating a length of a payload of each packet within the protocol compliant wireless message;
modulating a time response of the protocol compliant wireless message;
modulating a frequency response of the protocol compliant wireless message;
modulating a time sent for each packet of the protocol compliant wireless message;
modulating a time interval between adjacent packet of the protocol compliant wireless message;
modulating a packet rate of the protocol compliant wireless message; and
modulating a packet channel frequency of the protocol compliant wireless message.

16. A method for wireless communication, the method comprising:
a wireless protocol compliant device in a wireless network modulating backchannel data onto protocol compliant wireless messages, wherein the protocol compliant wireless messages comprise messages formed according to wireless standards as defined by groups including the Institute of Electrical and Electronics Engineers (IEEE) standards, and by consortiums, including Bluetooth, the wireless standards including mandatory modes that must be supported by the wireless protocol compliant device in order for the wireless protocol compliant device be considered compliant with one of the wireless standards;
the wireless protocol compliant device transmitting the protocol compliant wireless message to a peer device within wireless radio range; and
one or more backchannel devices within wireless radio range receiving the protocol compliant wireless messages and demodulating the backchannel data, wherein the one or more backchannel devices are not capable of processing the protocol compliant wireless messages according to the wireless standards according to which the protocol compliant wireless messages were sent.

17. The method of claim 16, wherein the wireless protocol compliant device in a wireless network modulating the backchannel data comprises one or more of:
modulating a packet length of each packet within the protocol compliant wireless messages;
modulating a length of a payload of each packet within the protocol compliant wireless messages;
modulating a time response of the protocol compliant wireless messages;

modulating a frequency response of the protocol compliant wireless messages;
modulating a time sent for each packet of the protocol compliant wireless messages;
modulating a time interval between adjacent packet of the protocol compliant wireless messages;
modulating a packet rate of the protocol compliant wireless messages; and
modulating a packet channel frequency of the protocol compliant wireless messages.

18. The method of claim 16, wherein the one or more backchannel devices comprise sensor devices that each includes a device that is compliant with the wireless standards, and that is not active unless interrogated, and wherein the backchannel data comprises a wakeup message for one or more backchannel devices that are not compliant with the wireless standards.

* * * * *